US010486499B2

(12) United States Patent
Stanke et al.

(10) Patent No.: US 10,486,499 B2
(45) Date of Patent: Nov. 26, 2019

(54) METHOD FOR CONTROLLING VEHICLE AIR-CONDITIONING SYSTEM, AND VEHICLE AIR-CONDITIONING SYSTEM

(71) Applicant: Hangzhou Sanhua Research Institute Co., Ltd., Hangzhou, Zhejiang (CN)

(72) Inventors: Edwin J. Stanke, Zhejiang (CN); Rongrong Zhang, Zhejiang (CN); Li Tang, Zhejiang (CN); Jun Zhang, Zhejiang (CN)

(73) Assignee: Hangzhou Sanhua Research Institute Co., Ltd., Hangzhou (CN)

( * ) Notice: Subject to any disclaimer, the term of this patent is extended or adjusted under 35 U.S.C. 154(b) by 379 days.

(21) Appl. No.: 14/904,802

(22) PCT Filed: Jul. 18, 2013

(86) PCT No.: PCT/CN2013/079591
§ 371 (c)(1),
(2) Date: Jan. 13, 2016

(87) PCT Pub. No.: WO2015/006955
PCT Pub. Date: Jan. 22, 2015

(65) Prior Publication Data
US 2016/0200176 A1 Jul. 14, 2016

(51) Int. Cl.
*B60H 1/32* (2006.01)
*F25B 49/02* (2006.01)
(52) U.S. Cl.
CPC ......... *B60H 1/3211* (2013.01); *B60H 1/3225* (2013.01); *F25B 49/02* (2013.01);
(Continued)

(58) Field of Classification Search
CPC ............ B60H 1/3211; B60H 1/3225; B60H 2001/3285; B60H 2001/3272;
(Continued)

(56) References Cited

U.S. PATENT DOCUMENTS 6,321,549 B1 * 11/2001 Reason .............. B60H 1/00885
62/223
6,405,554 B1 * 6/2002 Kawakatu ................ F25B 7/00
62/175
(Continued)

FOREIGN PATENT DOCUMENTS

CN 1890517 A 1/2007
CN 103245154 A 8/2013
(Continued)

OTHER PUBLICATIONS

EP Search Report for Application No. 13889552.9; dated Feb. 22, 2017.

*Primary Examiner* — Ljiljana V. Ciric
(74) *Attorney, Agent, or Firm* — Boyle Fredrickson S.C.

(57) ABSTRACT

A method for controlling a vehicle air-conditioning system and a vehicle air-conditioning system, the method includes acquiring an actual degree of superheat, a preset degree of superheat and a degree of opening of an electronic expansion valve; determining, according to the actual degree of superheat, the preset degree of superheat and the degree of opening of the electronic expansion valve and whether the electronic expansion valve is in a fault state; and outputting a control signal to an executive control mechanism to adjust a parameter of a device in a vehicle air-conditioning system, which influences the variation of the actual degree of superheat, so as to adjust the degree of superheat of the vehicle air-conditioning system.

14 Claims, 8 Drawing Sheets

(52) U.S. Cl.
CPC ........ *B60H 2001/3236* (2013.01); *B60H 2001/3267* (2013.01); *B60H 2001/3272* (2013.01); *B60H 2001/3285* (2013.01); *F25B 2500/19* (2013.01); *F25B 2600/2513* (2013.01)

(58) Field of Classification Search
CPC .... B60H 2001/3236; B60H 2001/3267; F25B 49/02; F25B 2600/2513; F25B 2500/19
See application file for complete search history.

(56) References Cited

U.S. PATENT DOCUMENTS

| | | | | |
|---|---|---|---|---|
| 9,222,706 | B2* | 12/2015 | Takayama | F25B 1/10 |
| 9,239,180 | B2* | 1/2016 | Ochiai | F25B 49/005 |
| 9,341,398 | B2* | 5/2016 | Liu | F25B 41/062 |
| 9,797,640 | B2* | 10/2017 | Umeda | F25B 49/02 |
| 9,829,230 | B2* | 11/2017 | Tamaki | F25B 49/00 |
| 9,829,231 | B2* | 11/2017 | Fukui | F25B 49/02 |
| 10,391,833 | B2* | 8/2019 | Tang | |
| 2001/0000050 | A1* | 3/2001 | Okazaki | F25B 25/00 62/149 |
| 2002/0139133 | A1* | 10/2002 | Hwang | F25B 49/022 62/210 |
| 2005/0126190 | A1 | 6/2005 | Lifson et al. | |
| 2009/0151378 | A1* | 6/2009 | Kawakatsu | F25B 49/02 62/225 |
| 2009/0158764 | A1* | 6/2009 | Kim | F25B 13/00 62/225 |
| 2009/0165481 | A1* | 7/2009 | Ko | F25B 49/005 62/195 |
| 2009/0165482 | A1* | 7/2009 | Ko | F25B 1/10 62/222 |
| 2010/0064723 | A1* | 3/2010 | Kawakatsu | F25B 49/027 62/507 |
| 2011/0192177 | A1* | 8/2011 | Bae | F24F 3/06 62/115 |
| 2013/0167567 | A1* | 7/2013 | Fukui | F25B 49/02 62/115 |
| 2014/0083123 | A1* | 3/2014 | Yamashita | F25B 13/00 62/222 |
| 2014/0238056 | A1* | 8/2014 | Kawakami | F25B 31/008 62/89 |
| 2015/0184880 | A1* | 7/2015 | Kawamura | F24F 11/00 700/276 |
| 2015/0298525 | A1* | 10/2015 | Miyakoshi | F25B 49/005 62/160 |
| 2016/0082810 | A1* | 3/2016 | Suzuki | B60H 1/00921 62/151 |
| 2016/0159198 | A1* | 6/2016 | Tang | B60H 1/00885 700/300 |
| 2016/0200176 | A1* | 7/2016 | Stanke | B60H 1/3211 62/115 |

FOREIGN PATENT DOCUMENTS

| | | |
|---|---|---|
| CN | 103423835 A | 12/2013 |
| EP | 1956323 A2 | 8/2008 |
| JP | 2006284073 A | 10/2006 |
| JP | 2006284074 A | 10/2006 |
| JP | 2007010220 | 1/2007 |
| KR | 20090021592 A | 3/2009 |

* cited by examiner

METHOD FOR CONTROLLING VEHICLE AIR-CONDITIONING SYSTEM, AND VEHICLE AIR-CONDITIONING SYSTEM

TECHNICAL FIELD

This application relates to a control method for a vehicle air-conditioning system and a vehicle air-conditioning system, and belongs to the technical field of vehicle air-conditioning control.

BACKGROUND

A vehicle air-conditioning system mainly includes a compressor, a condenser, a throttling clement, and an evaporator. A gaseous refrigerant with high temperature and high pressure discharged from the compressor changes into a liquid refrigerant after being condensed by the condenser. The liquid refrigerant is throttled and depressurized by the throttling element and then enters into the evaporator to exchange heat in the evaporator, with air outside the evaporator, and changes into the gaseous refrigerant and then flows back into the compressor, thus accomplishing a refrigeration cycle. The air enters into a vehicle compartment after being cooled by the evaporator, and if the temperature in the vehicle compartment is lower or higher than a preset temperature in the vehicle compartment, a superheat degree is controlled by controlling and regulating an opening degree of the throttling element.

Adopting an electronic expansion valve as the throttling element in the above process has advantages as follows.

The electronic expansion valve may be regulated according to various parameters in the air-conditioning system, and the corresponding control strategy is timely adjusted according to various working conditions, thus realizing improving of an efficiency of the refrigerating system, and the energy conservation and environment protection. Controlling the superheat degree by the electronic expansion valve is smoother than controlling the superheat degree by a thermal expansion valve, thus allowing a temperature of air outputted to be stable, and a degree of comfort to be improved.

However, in the conventional technology, when the electronic expansion valve generates a stalling fault and gets stuck somewhere thus cannot be operated, or when a fault occurs to the electronic expansion valve and the electronic expansion valve cannot be opened to a certain interval, the conventional vehicle air-conditioning system cannot take corresponding countermeasures against the fault, which may cause the air-conditioning system to be damaged.

SUMMARY

In order to address the above issues in the conventional technology, a control method for a vehicle air-conditioning system and a vehicle air-conditioning system are provided according to the present application to control a superheat degree of the vehicle air-conditioning system, and to enable the vehicle air-conditioning system to continue to operate with a normal performance or a degraded performance, so as not to cause damage to the system.

A control method for a vehicle air-conditioning system according to the present application includes obtaining a determination result whether an electronic expansion valve is in a fault state according to a current opening degree of the electronic expansion valve, an actual superheat degree, and a preset superheat degree acquired while performing a superheat degree control, and outputting a control signal to an executive control mechanism according to the determination result; adjusting, by the executive control mechanism, a parameter of a device affecting change of the actual superheat degree in the vehicle air-conditioning system, to adjust the superheat degree of the vehicle air-conditioning system; or controlling, by the executive control mechanism, turning off the compressor or the air-conditioning system.

The preset superheat degree here does not simply refers to a certain fixed value, and the preset superheat degree may be a corresponding value in a corresponding interval, or a table in which a corresponding value can be looked up according to a corresponding working condition, or a formula which can be obtained based on fitting, etc., and the preset superheat degree for each system is built m the control system according to the result of test, analysis, or fitting. Here, the "real time" in the term "acquiring the actual superheat degree in real time" refers to an acquisition frequency and a control frequency greater than or equal to an inherent sampling frequency of the system, such as 1 HZ, and for the same program, the acquisition frequency and the control frequency should be equal to each other, or the control frequency is an integral multiple of the real-time acquisition frequency.

In the control method, in determining whether the electronic expansion valve is currently in the fault state, a determination of whether the electronic expansion valve is abnormal is performed taken a first time span (t1) as a time determination period of the fault state, and then a number of continuous abnormality times of the electronic expansion valve is accumulated;

in the case that the accumulated number of continuous abnormality times is greater than or equal to a preset number of times, determining that the electronic expansion valve is in the fault state, and outputting a control signal to the executive control mechanism; and in the case that the accumulated number of continuous abnormality times is smaller than the preset number of times, outputting no control signal, by a control system, to the executive control mechanism, and entering a next fault diagnosis cycle.

In addition, condition 1 is configured to be that the preset superheat degree minus the actual superheat degree is greater than a first fixed value and the current opening degree of the electronic expansion valve reaches a minimum value, and condition 2 is configured to be that the actual superheat degree minus the preset superheat degree is greater than a second fixed value and a current theoretical opening degree of the electronic expansion valve reaches a maximum value in the case that the vehicle air-conditioning system satisfies the condition 1 or the condition 2, a determination result that the electronic expansion valve is in an abnormal state in the fault diagnosis cycle is obtained; and in the case that the vehicle air-conditioning system satisfies neither the condition 1 nor the condition 2, the accumulated number of continuous abnormality times (n) of the electronic expansion valve is reset.

A determining and processing process of the fault state comprises the following steps:

S01, acquiring the opening degree of the electronic expansion valve, the actual superheat degree, and the preset superheat degree;

S021, determining whether the preset superheat degree minus the actual superheat degree is greater than a first fixed value (w1), and performing step S022 if the preset superheat degree minus the actual superheat degree is greater than the first fixed value (w1), and performing step S025 if the preset superheat degree minus the actual superheat degree is not greater than the first fixed value (w1);

S022, determining whether the opening degree of the electronic expansion valve reaches the minimum value; and performing step S023 if the opening degree of the electronic expansion valve reaches the minimum value, and performing step S025 if the opening degree of the electronic expansion valve does not reach the minimum value;

S023, plus 1 to the accumulated number of continuous abnormality times (n) of the valve;

S024, determining whether the accumulated number of continuous abnormality times (n) is greater than or equal to a preset number of times (N); and if the accumulated number of continuous abnormality times (n) is greater than or equal to the preset number of times (N), determining that the electronic expansion valve is currently in the fault state and performing step S03; or simultaneously performing step S05;

S025, determining whether the actual superheat degree minus the preset superheat degree is greater than a second fixed value (w2), and performing step S026 if the actual superheat degree minus the preset superheat degree is greater than the second fixed value (w2), and performing step S05 and resetting the accumulated number of abnormality times if the actual superheat degree minus the preset superheat degree is not greater than the second fixed value (w2);

S026, determining whether the opening degree of the electronic expansion valve reaches a maximum value; and if the opening degree of the electronic expansion valve reaches the maximum value, performing step S023 and plus 1 to the accumulated number of continuous abnormality times (n) of the valve; and performing step S03 if the accumulated number of continuous abnormality times (n) is greater than or equal to the preset number of times (N); and if the opening degree of the electronic expansion valve does not reach the maximum value, performing step S05;

S03, outputting a control signal of the electronic expansion valve in the fault state to the executive control mechanism according to the determination result; and S05, resetting the number of abnormality times (n) of the valve.

Or the determining and processing process of the fault state comprises the following steps:

S01, acquiring the opening degree of the electronic expansion valve, the actual superheat degree, and the preset superheat degree;

S025, determining whether the actual superheat degree minus the preset superheat degree is greater than a second fixed value (w2), and performing step S026 if the actual superheat degree minus the preset superheat degree is greater than the second fixed value (w2), and performing step S021 if the actual superheat degree minus the preset superheat degree is not greater than the second fixed value (w2);

S026, determining whether the opening degree of the electronic expansion valve reaches a maximum value; and performing step S023 if the opening degree of the electronic expansion valve reaches the maximum value, and performing step S021 if the opening degree of the electronic expansion valve does not reach the maximum value;

S023, adding 1 to the number of abnormality times (n) of the valve;

S021, determining whether the preset superheat degree minus the actual superheat degree is greater than a first fixed value (w1), and performing step S022 if the preset superheat degree minus the actual superheat degree is greater than the first fixed value (w1), and performing step S05 and resetting the accumulated number of abnormality times (n) if the preset superheat degree minus the actual superheat degree is not greater than the first fixed value (w1);

S022 determining whether the opening degree of the electronic expansion valve reaches a minimum value; and performing step S023 and adding 1 to the number of abnormality times (n) of the valve if the opening degree of the electronic expansion valve reaches the minimum value, and performing step S05 and resetting the accumulated number of abnormality times (n) if the opening degree of the electronic expansion valve does not reach the minimum value;

S024, determining whether the accumulated number of abnormality times (n) is greater than or equal to a preset number of times (N); and if the accumulated number of abnormality times (n) is greater than or equal to the preset number of times (N), determining that the electronic expansion valve is in the fault state currently and performing step S03; or simultaneously performing step S05;

S03, outputting a control signal of the electronic expansion valve in the fault state to the executive control mechanism according to the determination result; and S05, resetting the number of abnormality times (n) of the valve.

Before performing the procedure of determining whether the electronic expansion valve is in the fault state, a step of determining whether the air-conditioning system is within a limiting working condition range is performed; and if the determination result is that the air-conditioning system is within the limiting working condition range, not performing the procedure of determining whether the electronic expansion valve is currently in the fault state in the current cycle, but waiting till entering to a next fault diagnosis cycle; and if the determination result is that the air-conditioning system is not within the limiting working condition range, performing the procedure of determining whether the electronic expansion valve is currently in the fault state.

On the premise that the determination result is the electronic expansion valve being in the fault state, in the case that the actual superheat degree is greater than a first preset auxiliary superheat degree, the control system outputs a control signal to an executive control mechanism, and the executive control mechanism controls reducing a rotational speed and/or a displacement $C_1$ of the compressor, or reducing a rotational speed of the evaporator fan, or turning off the compressor;

in the case that the actual superheat degree is smaller than a second preset auxiliary superheat degree, the control system outputs a control signal to the executive control mechanism, and the executive control mechanism controls increasing the rotational speed and/or the displacement ($C_1$) of the compressor, or increasing the rotational speed ($C_2$) of the evaporator fan, or turning off the compressor; and in the case that the actual superheat degree is greater than or equal to the second preset auxiliary superheat degree, and is smaller than or equal to the first preset auxiliary superheat degree, the control system outputs a control signal to the executive control mechanism, and the executive control mechanism controls keeping the rotational speed and/or the displacement ($C_1$) of the compressor, and the rotational speed ($C_2$) of the evaporator fan unchanged.

On the premise that the actual superheat degree is greater than the first preset auxiliary superheat degree, in the case that the rotational speed or the displacement ($C_1$) of the compressor is greater than a minimum value ($C_{1\,mm}+\Delta_1$), the control system outputs a control signal to the executive control mechanism, and the executive control mechanism controls reducing the rotational speed or the displacement ($C_1$) of the compressor;

in the case that the rotational speed or displacement ($C_1$) of the compressor reaches the minimum value ($C_{1\,min}+\Delta_1$), and the rotational speed ($C_2$) of the evaporator fan is greater than a minimum value ($C_{2\,min}+\Delta_2$), the control system outputs a control signal to the executive control mechanism, and the executive control mechanism controls reducing the rotational speed ($C_2$) of the evaporator fan: and in the case that the rotational speed or displacement ($C_1$) of the compressor reaches the minimum value ($C_{1\,min}+\Delta_1$), and the rotational speed ($C_2$) of the evaporator fan reaches the minimum value ($C_{2\,min}+\Delta_2$), the control system outputs a control signal to the executive control mechanism, and the executive control mechanism controls turning off the compressor;

and on the premise that the actual superheat degree is smaller than the second preset auxiliary superheat degree, in the case that a low pressure of the vehicle air-conditioning system is higher than a low pressure alarm value, a high pressure of the vehicle air-conditioning system is lower than a high pressure alarm value, and the rotational speed or the displacement ($C_1$) of the compressor is smaller than a maximum value ($C_{1\,max}-\Delta_3$) the control system outputs a control signal to the executive control mechanism, and the executive control mechanism controls increasing the rotational speed or the displacement ($C_1$) of the compressor;

in the case that the low pressure of the vehicle air-conditioning system is lower than the low pressure alarm value, or the high pressure of the vehicle air-conditioning system is higher than the high pressure alarm value, and the rotational speed ($C_2$) of the evaporator fan is less than a maximum value ($C_{2\,max}-\Delta_4$), the control system outputs a control signal to the executive control mechanism, and the executive control mechanism controls increasing the rotational speed ($C_2$) of the evaporator fan; and in the case that the low pressure of the vehicle air-conditioning system is lower than the low pressure alarm value, or the high pressure of the vehicle air-conditioning system is higher than the high pressure alarm value, and the rotational speed ($C_2$) of the evaporator fan reaches the maximum value ($C_{2\,max}-\Delta_4$), the control system outputs a control signal to the executive control mechanism, and the executive control mechanism controls turning off the compressor.

A control method for the superheat degree may further include:

acquiring, by the control system in real time, an actual superheat degree, a preset superheat degree, and a feedforward information affecting the change of the actual superheat degree, wherein the feedforward information including the change of the rotational speed and/or displacement of the compressor; and/or the change of the rotational speed of the evaporator fan; adjusting the opening degree of the electronic expansion valve in real time according to the actual superheat degree, the preset superheat degree, and the feedforward information acquired, to control the superheat degree of the vehicle air-conditioning system.

In the control method, a difference value of superheat degree is obtained by comparing the actual superheat degree acquired with the preset superheat degree acquired, and a corresponding first adjustment amount of the opening degree of the electronic expansion valve is obtained according to the difference value of superheat degree; and a corresponding second adjustment amount of the opening degree of the electronic expansion valve is obtained according to the change of the rotational speed and/or displacement of the compressor and/or the change of the rotational speed of the evaporator fan;

where a first adjustment amount $V_{out}1$ of the opening degree of the electronic expansion valve is obtained by calculating the following formula:

$$V_{out}1 = K_p \times e + K_d \times \frac{de}{dt} + K_i \times \int_n^t e\,dt + C$$

in the formula, e is a difference value of superheat degree between the actual superheat degree and the preset superheat degree, $K_p$ is a proportionality coefficient, $K_d$ is a differential coefficient, $K_i$ is an integral coefficient, and C is a correction coefficient;

A second adjustment amount $V_{out}2$ of the opening degree of the electronic expansion valve is any one of or the sum of a first part $V_{out}21$ of the second adjustment amount of the opening degree of the electronic expansion valve, and a second part $V_{out}22$ of the second adjustment amount of the opening degree of the electronic expansion valve, the first part $V_{out}21$ of the second adjustment amount of the opening degree of the electronic expansion valve is obtained by calculating the formula:

$$V_{out}21 = K_{CS} \times \frac{dCS}{dt},$$

or the formula:

$$V_{out}21 = K_{CD} \times \frac{dCD}{dt},$$

or the formula:

$$V_{out}21 = K_{CS} \times \frac{dCS}{dt} + K_{CD} \times \frac{dCD}{dt};$$

and the second part $V_{out}22$ of the second adjustment amount of the opening degree of the electronic expansion valve is obtained by calculating the formula:

$$V_{out}22 = K_{BS} \times \frac{dBS}{dt},$$

in the formula, $K_{CS}$ is a feedback coefficient of the rotational speed of the compressor, CS is the rotational speed of the compressor, BS is the rotational speed of the evaporator fan, and $K_{BS}$ is a feedback coefficient of the evaporator fan; CD is a displacement of the compressor, and $K_{CD}$ is a feedback coefficient of the displacement of the compressor; and the first part $V_{out}21$ of the second adjustment amount of the opening degree of the electronic expansion valve and the second part $V_{out}22$ of the second adjustment amount of the opening degree of the electronic expansion valve are added, and then a control signal for adjusting the opening degree is outputted to a control terminal of the electronic expansion valve.

A vehicle air-conditioning system is further provided according to the present application, which includes a compressor set and a throttling element, the compressor set includes a compressor, a condenser, an evaporator, and an evaporator fan, the throttling element includes an electronic expansion valve.

The vehicle air-conditioning system further includes:

a first acquisition module, configured to acquire an actual superheat degree and a current opening degree of the electronic expansion valve in real time;

a first controller, configured to store a preset superheat degree and receive the actual superheat degree and the current opening degree of the electronic expansion valve, and determine whether the electronic expansion valve is in a fault state according to the actual superheat degree, the preset superheat degree and the current opening degree of the electronic expansion valve, and generate a first control signal according to the actual superheat degree acquired when the determination result is that the electronic expansion valve is in a fault state; and an executive control mechanism, configured to receive a first control signal sent by the first controller, and control adjusting a parameter of a device affecting the actual superheat degree in the vehicle air-conditioning system according to the first control signal.

The first controller may include:

a determining module, configured to determine whether the electronic expansion valve is in a fault state according to the actual superheat degree, the preset superheat degree, and the current opening degree of the electronic expansion valve, and generate a first control command when the determination result is that the electronic expansion valve is in the fault state:

a first control module, configured to receive the first control command sent by the determining modulo, and control the executive control mechanism to execute the command of reducing the rotational speed and/or displacement $C_1$ of the compressor, or reducing the rotational speed $C_2$ of the evaporator fan, or turning off the compressor in the case that the actual superheat degree is greater than a first preset auxiliary superheat degree;

a second control module, configured to receive the first control command sent by the determining module, and control the executive control mechanism to execute the command of increasing the rotational speed or displacement $C_1$ of the compressor, or increasing the rotational speed $C_2$ of the evaporator fan, or turning off the compressor in the case that the actual superheat degree is smaller than a second preset auxiliary superheat degree; and a third control module, configured to receive the first control command sent by the determining module, and control the executive control mechanism to execute the command of keeping the rotational speed and/or displacement $C_1$ of the compressor unchanged, or keeping the rotational speed $C_2$ of the evaporator fan unchanged in the case that the actual superheat degree is greater than or equal to the second preset auxiliary superheat degree, and is smaller than or equal to the first preset auxiliary superheat degree.

The first control module may include:

a first command module, configured to control the executive control mechanism to execute the command of reducing the rotational speed or displacement $(C_1)$ of the compressor in the case that the rotational speed or displacement $(C_1)$ of the compressor is greater than a minimum value $(C_{1\ min}+\Delta_1)$;

a second command module, configured to control the executive control mechanism to execute the command of reducing the rotational speed $(C_2)$ of the evaporator fan in the case that the rotational speed or displacement $(C_1)$ of the compressor reaches the minimum value $(C_{1\ min}+\Delta_1)$ and the rotational speed $(C_2)$ of the evaporator fan is greater than a minimum value $(C_{2\ min}+\Delta_2)$;

a third command module, configured to control the executive control mechanism to execute the command of turning off the compressor in the case that the rotational speed or displacement $(C_1)$ of the compressor reaches the minimum value $(C_{1\ min}+\Delta_1)$, and the rotational speed $(C_2)$ of the evaporator fan reaches the minimum value $(C_{2\ min}+\Delta_2)$; and The second control module includes:

a fourth command module, configured to control the executive control mechanism to execute the command of increasing the rotational speed or displacement $(C_1)$ of the compressor in the case that a low pressure of the vehicle air-conditioning system is higher than a low pressure alarm value, and a high pressure of the vehicle air-conditioning system is lower than a high pressure alarm value and the rotational speed or displacement $(C_1)$ of the compressor is smaller than a maximum value $(C_{1\ max}-\Delta_3)$;

a fifth command module, configured to control the executive control mechanism to execute the command of increasing the rotational speed $(C_2)$ of the evaporator fan in the case that the low pressure of the vehicle air-conditioning system is lower than the low pressure alarm value, or the high pressure of the vehicle air-conditioning system is higher than the high pressure alarm value and the rotational speed $(C_2)$ of the evaporator fan is smaller than a maximum value $(C_{2\ max}-\Delta_4)$; and a sixth command module, configured to control the executive control mechanism to execute the command of turning off the compressor in the case that the low pressure of the vehicle air-conditioning system is lower than the low pressure alarm value, or the high pressure of the vehicle air-conditioning system is higher than the high pressure alarm value and the rotational speed $(C_2)$ of the evaporator fan reaches the maximum value $(C_{2\ max}-\Delta_4)$.

The vehicle air-conditioning system may further include:

a second acquisition module, configured to acquire a feedforward information affecting the change of the actual superheat degree in real time;

a second controller, configured to store a preset superheat degree and receive the actual superheat degree and the feedforward information, and adjust the current opening degree of the electronic expansion valve in real time according to the actual superheat degree, the preset superheat degree and the feedforward information; and the feedforward information includes a change of the rotational speed and/or displacement of the compressor; and/or a change of the rotational speed of the evaporator fan.

Each of the first acquisition module and the second acquisition module is in communication with the second controller via a vehicle controller area network (CAN) bus or a vehicle local interconnect network (LIN) bus; and each of the first controller and the second controller is in communication with the electronic expansion valve via a vehicle CAN bus or a vehicle LIN bus, Compared with the conventional technology, in the control method according to the present application, a determination result of whether an electronic expansion waive is in the fault state is obtained according to the opening degree of the electronic expansion valve, the actual superheat degree, and the preset superheat degree acquired, and the control signal is outputted to the executive control mechanism according to the determination result, and the executive control mechanism controls the parameter of the device affecting the change of the actual superheat degree in the vehicle air-conditioning system, to adjust the superheat degree of the air-conditioning system, to allow the vehicle air-conditioning system to continue to operate with a normal performance or a degraded performance.

Figure 7:
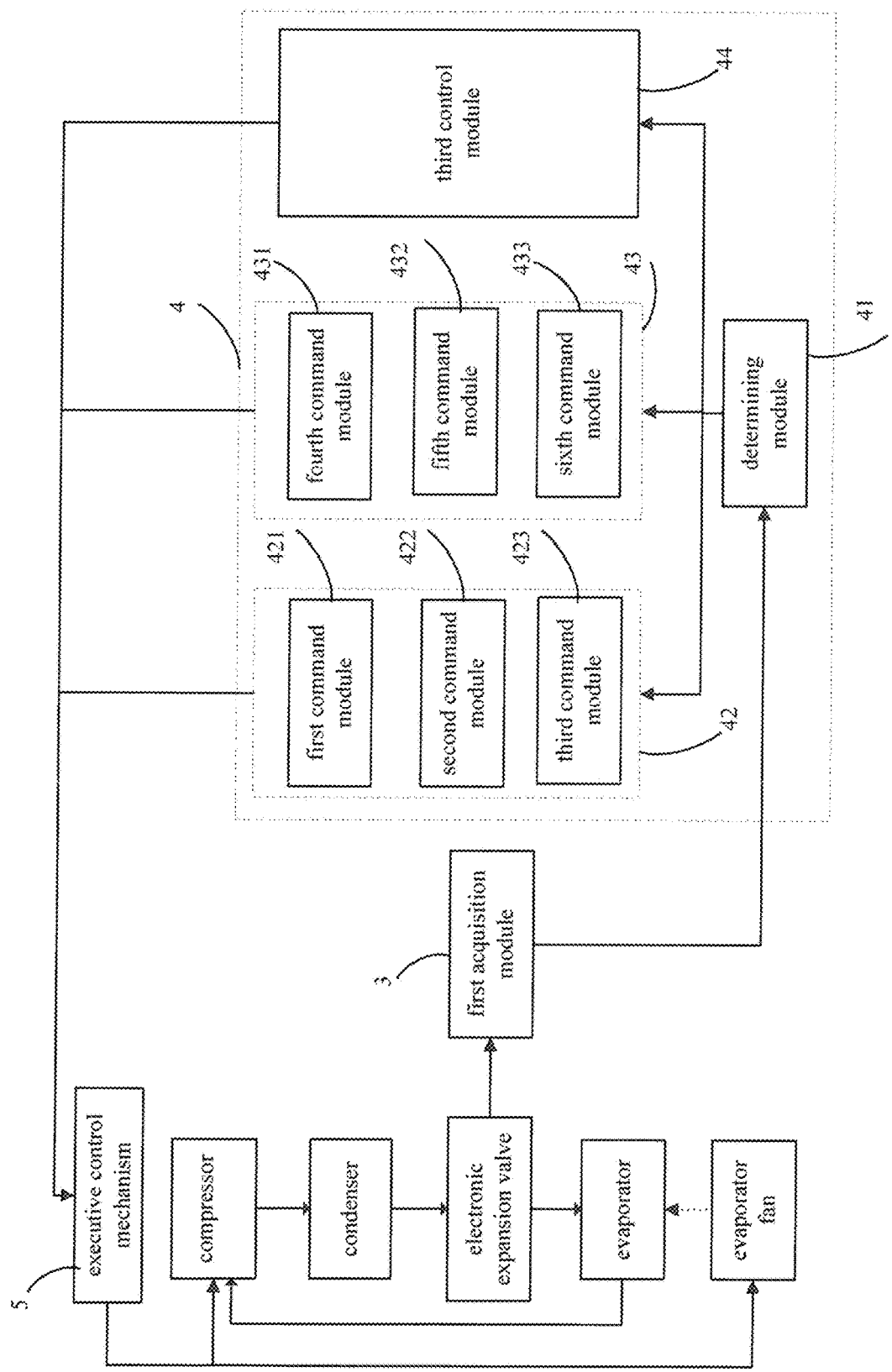
FIG. 7 is a schematic view showing the structure of a first embodiment of a vehicle air-conditioning system according to the present application.
Figure 8:
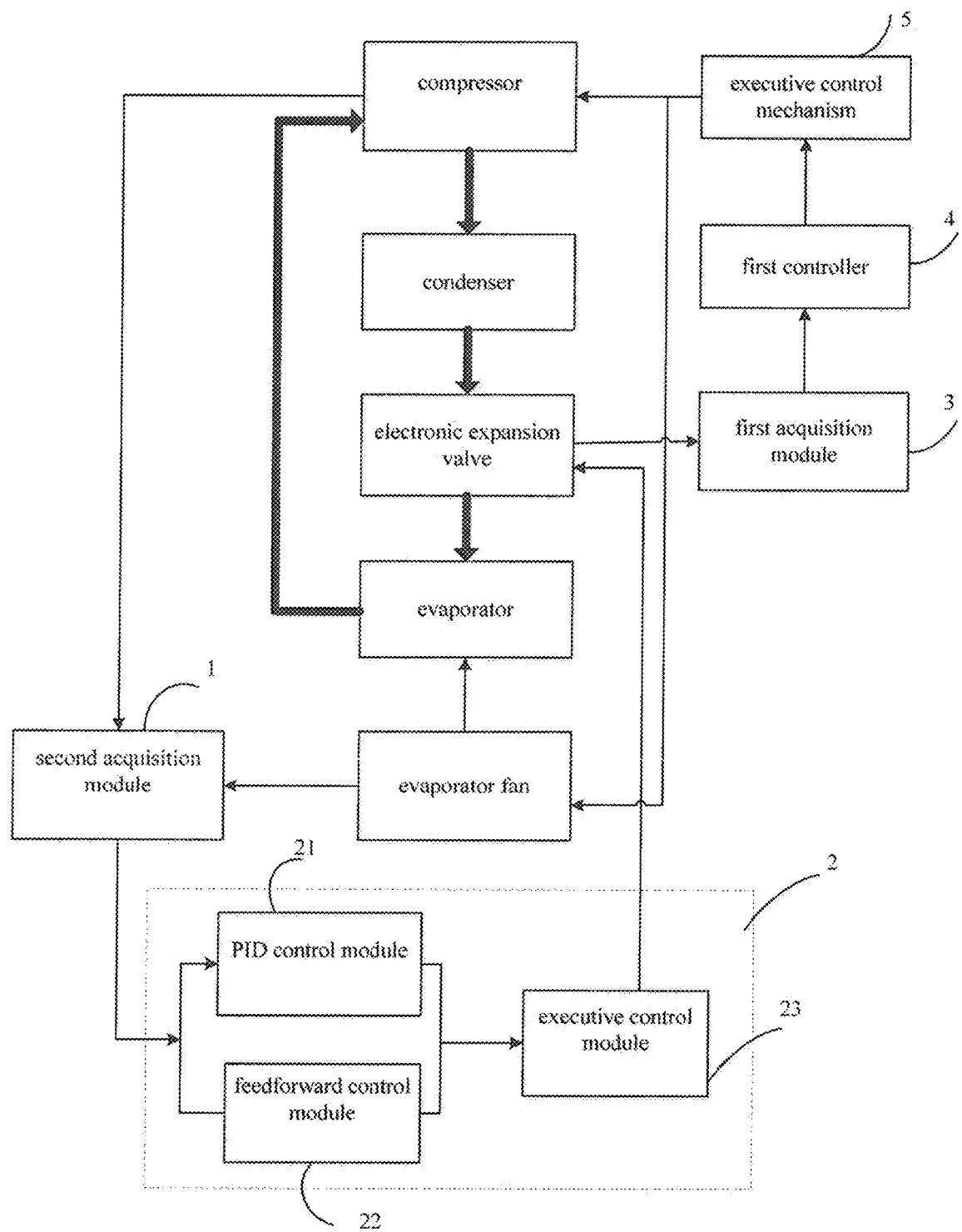
FIG. 8 is a schematic view showing the structure of a second embodiment of the vehicle air-conditioning system according to the present application.

The heavy solid lines in FIGS. 7 and 8 represent a refrigerant circulation.

DETAILED DESCRIPTION

Principles and features of the present application are described hereinafter in conjunction with the drawings, and the embodiments listed are only intended to illustrate the present application, and should not be interpreted as a limitation to the scope of the present application.

In the conventional technology, when an electronic expansion valve has a stalling fault, and is locked somewhere thus being unable to operate, or when a fault occurs to the electronic expansion valve to disable the electronic expansion valve to be opened to a certain interval, the current vehicle air-conditional system cannot take corresponding countermeasures against the fault, which may occasionally damage the air-conditioning system.

In view of the above deficiencies, a control method for a vehicle air-conditioning system is provided according to the present application, in which, a determination result whether an electronic expansion valve is currently in a fault state is obtained according to an opening degree of the electronic expansion valve, an actual superheat degree, and a preset superheat degree which are acquired; and a control signal is outputted to an executive control mechanism according to the determination result, and the executive control mechanism controls a parameter of a device affecting the change of the actual superheat degree in the vehicle air-conditioning system, to adjust the superheat degree of the vehicle air-conditioning system, thus allowing the vehicle air-conditioning system to continue to operate with a normal performance or a degraded performance, so as not to cause damage to the system.

Figure 1:
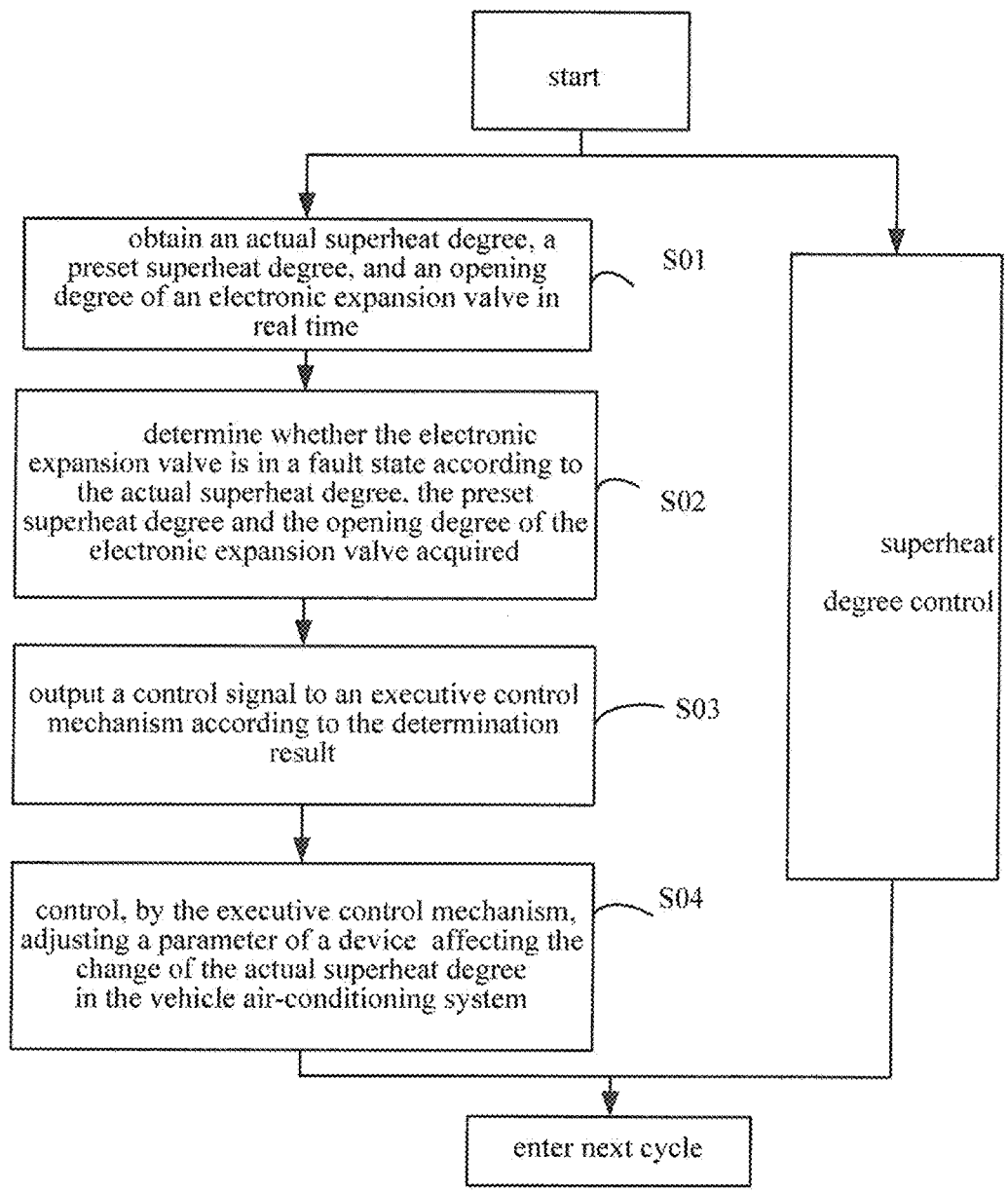
FIG. 1 is a schematic flow chart of a first embodiment of a control method for a vehicle air-conditioning system according to the present application.

A flow block diagram of a first embodiment of the control method for the vehicle air-conditioning system according to the present application is shown in FIG. 1. The control method for the vehicle air-conditioning system according to the present application includes steps S01 to S04.

In step S01, an opening degree of an electronic expansion valve, an actual superheat degree and a preset superheat degree are acquired in real time.

In step S02, whether the electronic expansion valve is in a fault state is determined according to the actual superheat degree, the preset superheat degree and the opening degree of the electronic expansion valve, and during controlling the superheat degree or while controlling the superheat degree, a fault diagnosis is effectively performed to the electronic expansion valve in real time.

In step S03, when the determination result is that the electronic expansion valve is in the fault state, a control signal is outputted to an executive control mechanism.

In step S04, the executive control mechanism controls and adjusts a parameter of a device affecting the change of the actual superheat degree in the vehicle air-conditioning system to adjust the superheat degree of the vehicle air conditioning system; or a compressor or the air-conditioning system is turned off.

Figure 2:
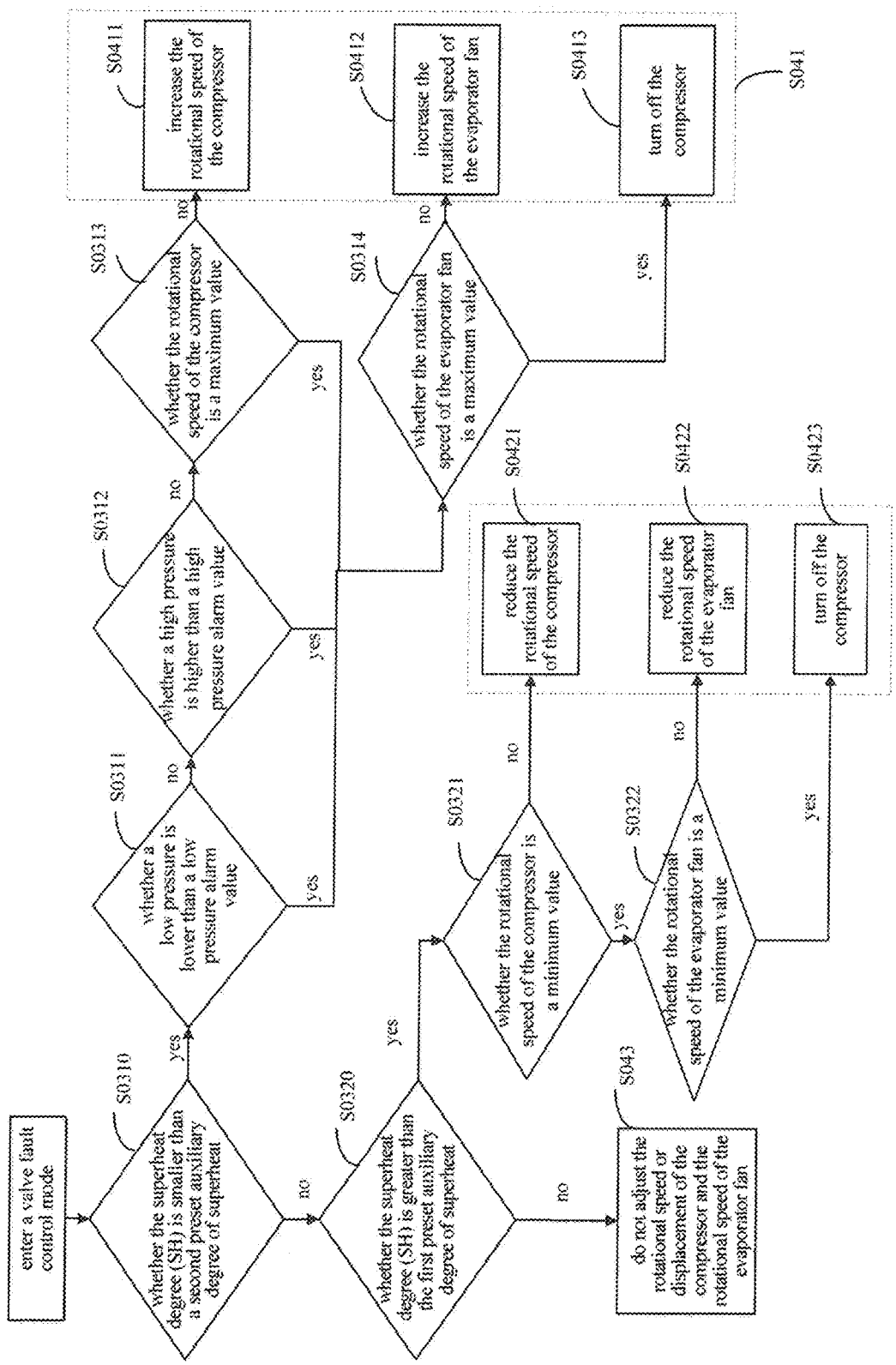
FIG. 2 is a schematic flow chart of a fault processing process of the control method for the vehicle air-conditioning system according to the present application.

In this embodiment, the parameter of the device affecting the change of the actual superheat degree in the vehicle air-conditioning system preferably includes: a rotational speed and/or a displacement $C_1$ of the compressor, a rotational speed $C_2$ of an evaporator fan. Of course, the parameter of the device affecting the change of the actual superheat degree may further include: a rotational speed of a condenser fan, etc., In the above steps S03 and S04, in the case that the determination result is that the electronic expansion valve is in the fault state, as shown in FIG. 2, specific control steps include steps S031 to S043.

Step S031 includes determining whether the actual superheat degree is smaller than a second preset auxiliary superheat degree; and if the actual superheat degree is smaller than the second preset auxiliary superheat degree, performing step S041, and if the actual superheat degree is not smaller than the second preset auxiliary superheat degree, performing S032.

Step S032 includes determining whether the actual superheat degree is greater than a first preset auxiliary superheat degree; and performing step S042 if the actual superheat degree is greater than the first preset auxiliary superheat degree and performing step S043 if the actual superheat degree is not greater than the first preset auxiliary superheat degree.

Step S041 includes increasing the rotational speed or the displacement $C_1$ of the compressor, or increasing the rotational speed of the evaporator fan, or shutting down the compressor.

Step S042 includes reducing the rotational speed or displacement $C_1$ of the compressor, or reducing the rotational speed $C_2$ of the evaporator fan, or shutting down the compressor.

Step S043 includes not adjusting the rotational speed or displacement of the compressor and the rotational speed $C_2$ of the evaporator fan.

In the above steps, the first preset auxiliary superheat degree may be set according to an actual situation. In addition, the above diagnosis and processing procedures may be performed simultaneously with controlling of the superheat degree control, or may also be a part set in the control procedures of the superheat degree. The sequence of steps S031, S032 in the above steps may be adjusted, that is, firstly determining whether the actual superheat degree is greater than the first preset auxiliary superheat degree first, and then determining whether the actual superheat degree is smaller than the second preset auxiliary superheat degree.

As shown in FIG. 2, in the above step S031, in the case that the actual superheat degree is smaller than the second preset auxiliary superheat degree, the following control steps S0310 to S0413 are included specifically.

Step S0310 includes determining whether the actual superheat degree is smaller than the second preset auxiliary superheat degree; and performing step S0311 if the actual superheat degree is smaller than the second preset auxiliary superheat degree and performing step S0320 if the actual superheat degree is not smaller than the second preset auxiliary superheat degree.

Step S0311 includes determining whether a low pressure is lower than a low pressure alarm value; and performing step S0314 if the low pressure is lower than the low pressure alarm value and performing step S0312 if the low pressure is not lower than the low pressure alarm value, Step S0312 includes determining whether a high pressure is greater than a high pressure alarm value; and performing step S0314 if the high pressure is higher than the high pressure alarm value and performing step S0313 if the high pressure is not higher than the high pressure alarm value.

Step S0313 includes determining whether the rotational speed or the displacement of the compressor is a maximum value $C_{1\ max}-\Delta_3$; and performing step S0314 if the rotational speed or displacement $C_1$ of the compressor is the maximum value $C_{1\ max}-\Delta_3$ and performing step S0411 if the rotational speed or displacement $C_1$ of the compressor is not the maximum value $C_{1\ max}-\Delta_3$.

Step S0314 includes determining whether the rotational speed of the evaporator fan $C_2$ is a maximum value $C_{2\ max}-\Delta_4$ and performing step S0413 if the rotational speed of the evaporator fan $C_2$ is the maximum value $C_{2\ max}-\Delta_4$, and performing step S0412 if the rotational speed of the evaporator fan $C_2$ is not the maximum value $C_{2\ max}-\Delta_4$.

Step S0411 includes increasing the rotational speed or the displacement $C_1$ of the compressor.

Step S0412 includes increasing the rotational speed of the evaporator fan $C_2$.

Step S0413 includes shutting off the compressor.

In the above steps, $\Delta_3 \geq 0$, $\Delta_4 \geq 0$, and values of $\Delta_3$ and $\Delta_4$ may be set according to the actual situation, thus ensuring safe operations of the compressor and the evaporator fan.

In addition, in the case that the determination result indicates that the electronic expansion valve is in the fault state and the control system enters a fault control mode, generally the control system may not perform determining whether the electronic expansion valve is in the fault state.

As shown in FIG. 2, in the above step S032, in the case that the actual superheat degree is smaller than the first preset auxiliary superheat degree, the following control steps S0320 to S0423 are included specifically.

Step S0320 includes determining whether the actual superheat degree is greater than the first preset auxiliary superheat degree; and performing step S0321 if the actual superheat degree is greater than the first preset auxiliary superheat degree and performing step S043 if the actual superheat degree is not greater than the first preset auxiliary superheat degree.

Step S0321 includes determining whether the rotational speed or displacement $C_1$ of the compressor is a minimum value $C_{1\ min}+\Delta_1$; and performing step S0322 if the rotational speed or displacement $C_1$ of the compressor is the minimum value $C_{1\ min}+\Delta_1$, and performing step S0421 if the rotational speed or displacement $C_1$ of the compressor is not the minimum value $C_{1\ min}+\Delta_1$.

Step S0322 includes determining whether the rotational speed of the evaporator fan $C_2$ is a minimum value $C_{2\ min}+\Delta_2$; and performing step S0423 if the rotational speed of the evaporator fan $C_2$ is the minimum value $C_{2\ min}+\Delta_2$, and performing step S0422 if the rotational speed of the evaporator fan $C_2$ is not the minimum $C_{2\ min}+\Delta_2$.

Step S0421 includes reducing the rotational speed or the displacement of the compressor.

Step S0422 includes reducing the rotational speed of the evaporator fan $C_2$.

Step S0423 includes shutting off the compressor.

In the above steps, $\Delta_1 \geq 0$. $\Delta_2 \geq 0$, and values of $\Delta_1$ and $\Delta_2$ can be set according to the actual situations, thus ensuring safe operations of the compressor and the evaporator fan.

The above control process is described hereinafter through an example. Assuming a stalling situation occurs when the opening degree of the electronic expansion valve is 50%, a flow rate required by the system at this moment is less than the flow rate provided by the electronic expansion valve with such opening degree, thus the situation that the actual superheat degree is less than the preset superheat degree occurs. Therefore, firstly, determining whether the low pressure of the system is lower than the low pressure alarm value, and the high pressure of the system is higher than the high pressure alarm value, and if such two cases occur, since increasing the rotational speed (or the displacement) of the compressor may further decrease the low pressure and increase the high pressure, the superheat degree cannot be controlled by adjusting the rotational speed of the compressor, for example, increasing the rotational speed (or the displacement) of the compressor, and the superheat degree can be increased only by increasing the rotational speed of the evaporator fan; and if such two situations don't occur, the superheat degree may be increased preferably by increasing the rotational speed (or the displacement) of the compressor because change of the rotational speed of the evaporator fan may adversely affect a comfort degree in the vehicle compartment.

Moreover, in the controlling process, if a current opening degree of the electronic expansion valve in the stalling situation is greater than the opening degree actually required, a refrigerating output generated by the vehicle air-conditioning system is more than the refrigerating output actually required, and the refrigerating output that is redundant may be neutralized by heat of a heating core; and if the opening degree of the electronic expansion valve in the stalling situation is smaller than the opening degree actually required, the refrigerating output generated by the vehicle air-conditioning system is less than the refrigerating output actually required, and the system may continue the process of fault processing.

In the control method for the vehicle air-conditioning system according to the present application, in the case that a fault occurs to the electronic expansion valve, the rotational speeds of the compressor and the evaporator fan may be adjusted to allow the system to continue to operate with a normal performance or a degraded performance while the system keeps a reasonable superheat degree, to allow the vehicle compartment to still have a refrigerating effect, and a battery to be cooled, so as not to cause damage to the system. The compressor here particularly refers to a variable-frequency electrically driven compressor.

Figure 3:
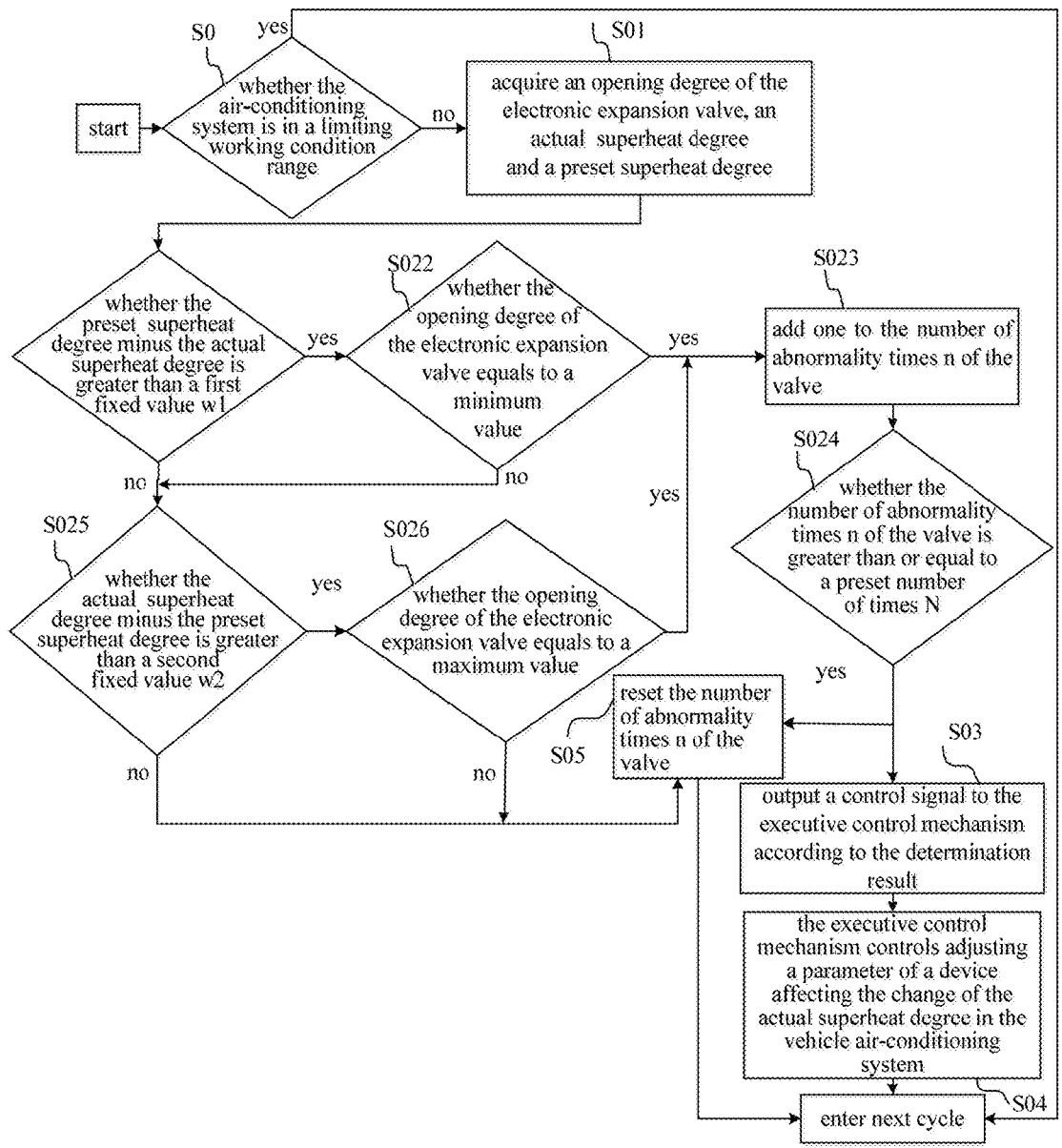
FIG. 3 is a schematic flow chart of a fault diagnosing process of the control method for the vehicle air-conditioning system according to the present application.

Besides, in this embodiment as shown in FIG. 3, step S02 is a process of diagnosing a fault according to a relationship between the actual superheat degree and the preset superheat degree, and the degree of opening of the electronic expansion valve. The process of determining and processing a fault state includes the following steps S01 to S05.

Step S01 includes acquiring an opening degree of the electronic expansion valve, an actual superheat degree, and a preset superheat degree.

Step S021 includes determining whether a difference value of the preset superheat degree subtracting the actual superheat degree is greater than a first fixed value w1, and performing step S022 if the difference value of the preset superheat degree subtracting the actual superheat degree is greater than the first fixed value w1 and performing step S025 if the difference value of the preset superheat degree subtracting the actual superheat degree is not greater than the first fixed value w1.

Step S022 includes determining whether the opening degree of the electronic expansion valve reaches a minimum value; and performing step S023 if the opening degree of the electronic expansion valve reaches the minimum value and performing step S025 if the opening degree of the electronic expansion valve does not reach the minimum value.

Step S023 includes increasing a number of abnormality times n of the electronic expansion valve by 1.

Step S024 includes determining whether the accumulated number of abnormality times n is greater than or equal to a preset number of times N; and determining that the electronic expansion valve is currently in the fault state if the accumulated number of abnormality times n is greater than or equal to the preset number of times N, and then performing step S03 or simultaneously performing step S05.

Step S03 includes outputting a control signal to an executive control mechanism according to the determination result.

Step S05 includes resetting the number of abnormality times n of the valve.

Specifically, in step S024, if the accumulated number of abnormality times n of the electronic expansion valve is less than the preset number of times N, temporarily determining that the electronic expansion valve is currently in the normal state, and not outputting the control signal to the execution mechanism for the time being, and entering the next fault diagnosis cycle. In the operation process, if it is determined in the next fault diagnosis cycle that the operation is not abnormal, determining the corresponding error report is caused due to an external factor, and the accumulated number of abnormality times n of a process parameter is reset. In addition, in this procedure, determining whether the electronic expansion valve is abnormal is performed taken a first time span (t1) as a time determination period of the fault state. The first time span (t1) may be the same as a time interval of the superheat degree controlling performed by the control system, in addition, may also be an integer multiple of the time interval of the superheat degree controlling, or the time interval of the superheat degree controlling may be an integer multiple of the first time span (t1).

That is to say, in the case that the preset superheat degree is greater than the actual superheat degree, the electronic expansion valve performs an action of reducing the opening degree to increase the actual superheat degree in order to reach the preset superheat degree. Apparently, in the above steps S021 and S022, the preset superheat degree may be greater than the actual superheat degree by the first fixed value w1, and in such a case the opening degree of the electronic expansion valve reaches the minimum value, thus determining that an abnormality occurs in controlling the superheat degree.

On the contrary, in the case that the actual superheat degree is greater than the preset superheat degree, the electronic expansion valve performs an action of increasing the opening degree to reduce the actual superheat degree in order to reach the preset superheat degree. Similarly, in the case that the preset superheat degree is greater than the actual superheat degree by a second fixed value w2, and the opening degree of the electronic expansion valve reaches the maximum value at that time, determining that an abnormality occurs in controlling the superheat degree. As shown in FIG. 3, the following steps S025 to S025 are performed specifically.

Step S025 includes determining whether a difference value of the actual superheat degree subtracting the preset superheat degree is greater than the second fixed value w2; and performing step S026 if the actual superheat degree minus the preset superheat degree is greater than the second fixed value w2, and performing step S05 if the difference value of the actual superheat degree subtracting the preset superheat degree is greater than the second fixed value w2, namely, the corresponding error report is caused by the influence of external factors, resetting the accumulated number of abnormality times n of the process parameter, and entering a next fault diagnosis cycle.

Step S026 includes determining whether the opening degree of the electronic expansion valve reaches a maximum value, if the opening degree of the electronic expansion valve reaches the maximum value, performing step S023 and increasing the number of abnormality times n of the valve by 1; and if two numbers of abnormality times n that are accumulated are greater than or equal to the preset number of continuous abnormality times N, performing step S03 to output a control signal to the executive control mechanism according to the determination result, if the two numbers of continuous abnormality times n that are accumulated are not greater than or equal to the preset number of abnormality times N, performing step S05.

In addition, a vehicle is required to work within a limiting working condition range designed by a refrigerating system, for example, the vehicle works in a special working condition such as a condition in which a temperature outside a vehicle compartment exceeds a limiting temperature designed by the refrigerating system of the vehicle. Influenced by the above special working condition, an operating parameter of the refrigerating system may usually generate the above error report phenomenon. Apparently, interference of various external factors which are beyond the limiting working condition range may directly affect an accuracy of the fault diagnosis in the control method according to this solution. For addressing this issue, step S0 of determining whether the vehicle air-conditioning system is within the limiting working condition range may be added before step S01, as shown in FIG. 3 specifically.

Step S0 includes determining whether the air-conditioning system is within the limiting working condition range, performing step S01 to enter the process of determining and processing the fault state if the air-conditioning system is not within the limiting working condition range; and entering a next fault diagnosis cycle if the air-conditioning system is within the limiting working condition range, that is, stopping performing the subsequent fault diagnosis steps to avoid a problem of error report under abnormal conditions. Or, it may be said that, the control method according to the present application is generally adapted to the control of the vehicle air-conditioning system under normal operating conditions, which may be specifically set by a control program.

Of course, the determination process of the fault state of the electronic expansion valve may also adopt other methods. The fault state of the electronic expansion valve in this specification includes situations such as a fault occurs to the electronic expansion valve itself, or a fault occurs to a communication of the electronic expansion valve. For a simple and convenient description, in this specification, all of the faults are uniformly named as fault of the electronic expansion valve. In addition, the opening degree of the electronic expansion able acquired here generally refers to a theoretical opening degree, for example in the case that a software part in a control system is in a vehicle-mounted controller and may communicate with the electronic expansion valve via the communication mode of controller area network and local interconnect network (CAN/LIN), and in the case that the electronic expansion valve can feedback a location information, the opening degree of the electronic expansion valve refers to the opening degree fed back by the electronic expansion valve, in a range of fault diagnosis here only covers the electronic expansion valve; in the case that the electronic expansion value cannot feedback information, the opening degree of the electronic expansion valve refers to the opening degree to which the electronic expansion valve is required to operate by an outputted command of a software program in the control system, the range of fault diagnosis here covers the electronic expansion valve and a communication program. In the case that the software part in the control system is located in the electronic expansion valve and action of the electronic expansion valve is directly controlled, the opening degree of the electronic expansion valve refers to a command location outputted by the program, and the range of fault diagnosis here only covers the electronic expansion valve. In addition, the above diagnosis and processing procedures may be simultaneously performed with the superheat degree controlling, and may also be a part in a superheat degree controlling procedure. In the case that an action detection device is mounted in the electronic expansion valve, the opening degree of the electronic expansion valve acquired may also be the actual opening degree of the electronic expansion valve.

In addition, in the conventional technology, in a household or commercial air-conditioning system taking electronic expansion valves as a throttling element, a control method for the superheat degree is generally realized by employing the actual superheat degree as a proportion integration differentiation (PID) input parameter to control the opening degree of the electronic expansion valve, thus problems of a slow response speed, and being easily over-adjusted, etc. may exist. To solve the above technical problems, a feedforward strategy is adopted to control the superheat degree in a method according to the present application, that is, in addition to employing the actual superheat degree as the PID input parameter to control the opening degree of the electronic expansion valve, the opening degree of the electronic expansion valve is further controlled according to a feedforward information acquired in real time, thus a response speed thereof is fast, and the superheat degree is smoothly controlled.

Hereby, firstly the feedforward is described as follows.

The feedforward refers to that a control output of the system is not only related to change of a parameter of an object that is controlled, and is further related to a disturbance factor which influences the change of parameter of the object that is controlled, for example, the controlling of opening degree of the electronic expansion valve is not only related to the change of the actual superheat degree, but also related to other parameters affecting the change of the actual superheat degree and responding more timely to change of the working condition than the actual superheat degree does in the vehicle air-conditioning system. Therefore, through the feedforward control strategy, the system is allowed to adjust when the working condition changes and before the object that is controlled (actual superheat degree) being affected, to achieve a better control quality. For example, meanwhile or slightly delaying for a certain time the rotational speed or displacement of the compressor, and the rotational speed of the evaporator fan change, and before the superheat degree changes, the opening degree of the electronic expansion valve is adaptively adjusted in advance.

Figure 4:
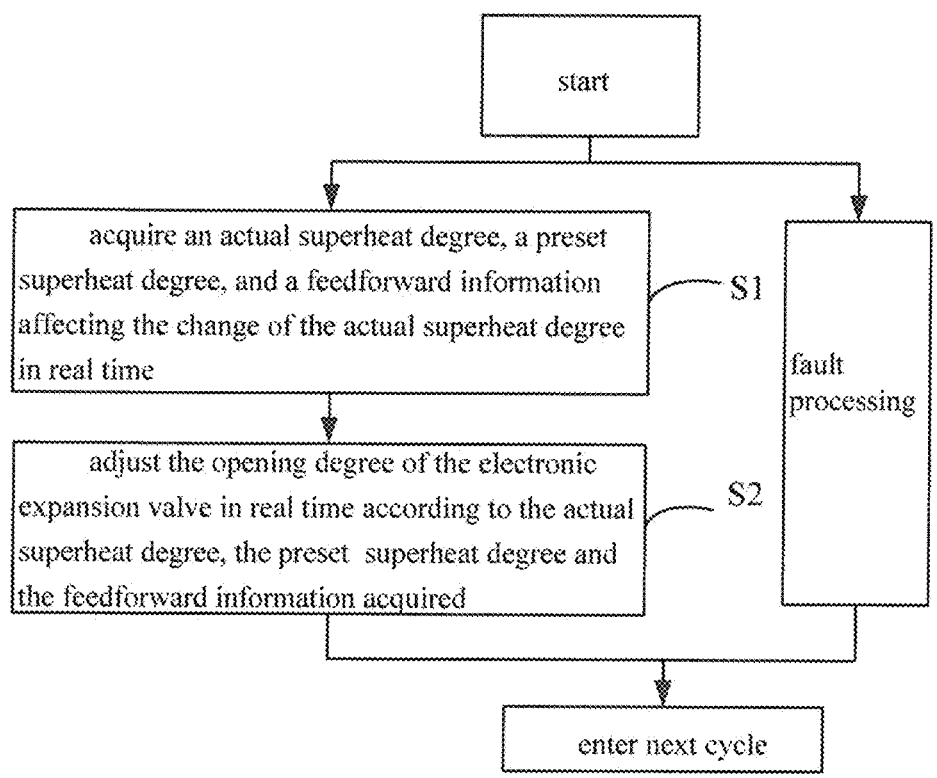
FIG. 4 is a schematic flow chart of a second embodiment of the control method for the vehicle air-conditioning system according to the present application.

Reference is made to FIG. 4, in conjunction with the above description, in a second embodiment of the method according to the present application, in addition to the fault determining and processing procedures, the control method for the vehicle air-conditioning system further includes a control procedure for the superheat degree, and the control procedure for the superheat degree includes the following steps S1 to S2.

S1 includes acquiring an actual superheat degree and a preset superheat degree in real time, and acquiring a feedforward information affecting the change of the actual superheat degree in real time.

Step S2 includes adjusting the opening degree of the electronic expansion valve in real time according to the actual superheat degree, the preset superheat degree and the feedforward information acquired, to control the superheat degree of the vehicle air-conditioning system.

The "real time" in the "adjusting, the opening degree of the electronic expansion valve in real time" refers to that after a variable required to be adjusted reaches (that is greater than or equal to) a minimum value set by the program, a control signal may be outputted to adjust the opening degree of the electronic expansion valve, and in the case that variable required to be adjusted is very small, namely, is smaller than the minimum value set by the program, the electronic expansion valve does not act; and the minimum value set by the program may change with an opening degree interval in which the electronic expansion valve is. A plurality of intervals are arranged in a full opening degree of the electronic expansion valve, and each interval has corresponding minimum action steps. The minimum action steps corresponding to each interval may be different and when the action steps of the electronic expansion valve required by a current calculation result are less than the minimum action steps corresponding to the interval where the electronic expansion valve is located, the electronic expansion valve keeps still, until a value of action steps required is greater than the that of the minimum motion steps. Generally, the smaller the opening degree of the electronic expansion valve is, the less the minimum motion steps the corresponding interval has, thus, the disturbance to the system can be reduced.

In view of the feedforward information affecting the actual superheat degree in the vehicle air-conditioning system, generally, the vehicle air-conditioning system mainly includes a compressor, a condenser, a throttling element, and an evaporator. In the case that the vehicle air-conditioning system is in a stable working condition, a rotational speed and a displacement of the compressor a rotational speed of the evaporator fan, an ambient temperature of the vehicle, a temperature in the vehicle, and an opening degree of the electronic expansion valve are all in a relatively stable state. When the ambient environment applies a disturbance to the vehicle air-conditioning system at a certain moment for example, the vehicle is driven from a tree shade or a tunnel to a place in the sun, the working condition changes, resulting in an abrupt increase of the temperature in the vehicle, and a temperature of the evaporator increases, and an evaporating pressure thereof increases. In order to reach a preset air-out temperature, the rotational speed of the compressor is gradually increased, and the rotational speed of the evaporator fan is gradually increased. In such a case, if the opening degree of the electronic expansion valve keeps unchanged, the situation that the evaporating pressure is decreased while a refrigerating capacity is not much increased may occur, and a phenomenon of the actual superheat degree being over high may be presented. Put simply, when the working condition changes, the rotational speed (or displacement) of the compressor is increased, and the rotational speed of the evaporator fan is increased, which may cause the actual superheat degree to be increased, and vice versa. And for allowing the refrigerating system to have a greater flow rate, the opening degree of the electronic expansion valve is required to be continuously increased, to allow the actual superheat degree to return to the set value.

As can be known from the above whole process, after the working condition changes, and after the rotational speed of the evaporator fan, and the rotational speed and/or displacement of the compressor have been increased for a certain time (generally, 5 to 10 seconds, which is determined according to sensitivities of a pressure sensor and a temperature sensor configured to acquire the actual superheat degree), the pressure sensor and the temperature sensor can then learn an actual change of the working condition, and further start to adjust the opening degree of the electronic expansion valve.

Therefore, the feedforward information according to the present application is preferably as follows: for a variable displacement compressor, the feedforward information includes a rotational speed and displacement of the compressor, and for a fixed displacement compressor, the feedforward information includes the rotational speed of the compressor; and/or change information of the rotational speed of the evaporator fan. Of course, as can be seen from the above whole process, and in conjunction with an operating principle of the air-conditioning system, the feedforward information may further include a rotational speed of a condenser fan, etc.

Figure 5:
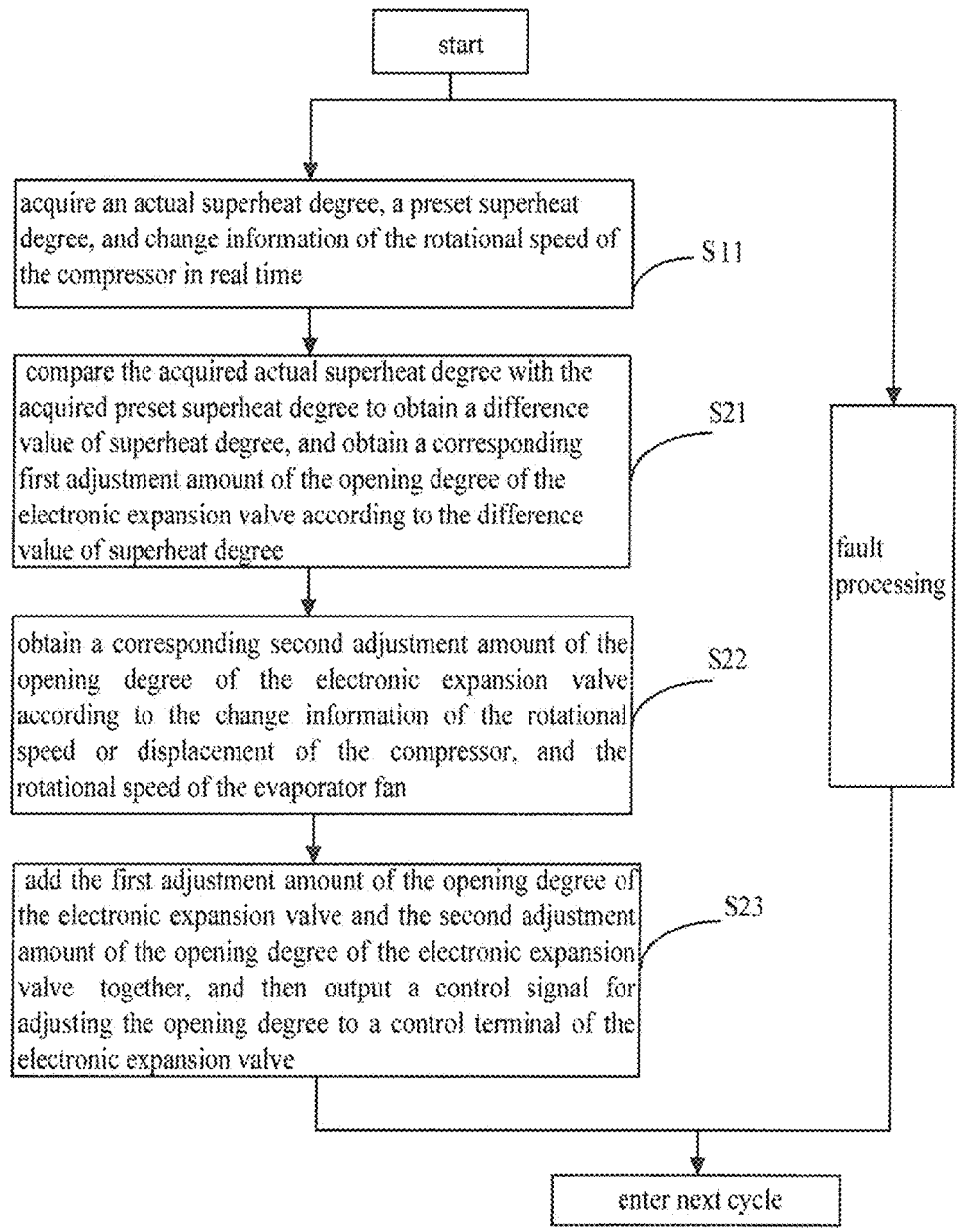
FIG. 5 is a schematic flow chart of a third embodiment of the control method for the vehicle air-conditioning system according to the present application.

Reference is made to FIG. 5, which is a flow chart of a third embodiment of the control method according to the present application.

As shown in FIG. 5, the feedforward information may include changes of the rotational speed and displacement of the compressor, the evaporator fan, and the condenser fan. A superheat degree control method for the vehicle air-conditioning system specifically includes the following steps S11 to S23.

Step S11 includes acquiring an actual superheat degree, a preset superheat degree, and change information of the rotational speed of the compressor in real time.

Step S21 includes comparing the actual superheat degree acquired with the preset superheat degree acquired to obtain a difference value of the superheat degree, and obtaining a corresponding first adjustment amount $V_{out}1$ of the opening degree of the electronic expansion valve according to the difference value of the superheat degree; specifically, in the case that the opening degree of the electronic expansion valve is controlled by the actual superheat degree, the first adjustment amount $V_{out}1$ of the opening degree of the electronic expansion valve may be obtained by calculation according to the following formula:

$$V_{out}1 = K_p \times e + K_d \times \frac{de}{dt} + K_i \times \int_n^t e\, dt + C,$$

where, e is a difference value of the superheat degree between the actual superheat degree and the preset superheat degree, $K_p$ is a proportionality coefficient, $K_d$ is a differential coefficient, $K_i$ is an integral coefficient, and C is a correction coefficient; and the proportionality coefficient $K_p$, the differential coefficient $K_d$, the correction coefficient C, and the integral coefficient $K_i$ may be obtained according to the experience or an experimental calibration or fitting.

Step S22 includes obtaining a second adjustment amount of the opening degree of the electronic expansion valve by calculation according to the feedforward information condition acquired. In the case that only the change information of the rotational speed of the compressor is considered, the second adjustment amount $V_{out}2$ of the opening degree of the electronic expansion valve may be obtained by calculation through the following formula:

$$V_{out}2 = K_{CS} \times \frac{dCS}{dt},$$

in the formula, $K_{CS}$ is a feedback coefficient of the compressor, and CS is the change of the rotational speed of the compressor;

where, the feedback coefficient of the compressor $K_{CS}$, is a coefficient obtained according to experience, an experimental calibration or fitting.

Step S23 includes adding the first adjustment amount $V_{out}1$ of the opening degree of the electronic expansion valve and the second adjustment amount $V_{out}2$ of the opening degree of the electronic expansion valve together, and outputting a control signal for adjusting the opening degree to a control terminal of the electronic expansion valve, to control the opening degree of the electronic expansion valve, that is, an adjustment amount $V_{out}$ of the opening degree of the electronic expansion valve may be obtained by calculation through the following formula:

$$V_{out} = K_p \times e + K_d \times \frac{de}{dt} + C + K_i \times \int_n^t e\, dt + K_{CS} \times \frac{dCS}{dt},$$

in the formula, e is a difference value of the superheat degree between the actual superheat degree and the preset superheat degree, $K_p$ is a proportionality coefficient, $K_d$ is a differential coefficient, $K_i$ is an integral coefficient, $K_{CS}$ is a feedback coefficient of the compressor, CS is a rotational speed of the compressor, and C is a correction coefficient.

In the case that the change of the rotational speed of the evaporator fan is considered into the feedforward information, steps S22' to S23' are performed.

Step S22' includes obtaining a corresponding second adjustment amount $V_{out}2$ of the opening degree of the electronic expansion valve according to change information of the rotational speed of the evaporator fan acquired;

$$V_{out}2 = K_{BS} \times \frac{dBS}{dt},$$

in the formula, BS is a rotational speed of the evaporator fan, and $K_{BS}$ is a feedback coefficient of the evaporator fan; where, the feedback coefficient of the evaporator fan $K_{BS}$ is a coefficient obtained according to experience or experimental calibration or fitting.

Step S23' includes adding the first adjustment amount $V_{out}1$ of the opening degree of the electronic expansion valve and the second adjustment amount $V_{out}2$ of the opening degree of the electronic expansion valve together and outputting a control signal for adjusting the opening degree to the control terminal of the electronic expansion valve, to control the opening degree of the electronic expansion valve, namely, the adjustment amount $V_{out}$ of the opening degree of the electronic expansion valve may be obtained by calculation through the following formula:

$$V_{out} = K_p \times e + K_d \times \frac{de}{dt} + C + K_i \times \int_n^t e\,dt + K_{BS} \times \frac{dBS}{dt}.$$

In the case that the change information of the rotational speed of the evaporator fan and the change information of the rotational speed of the compressor are both considered into the feedforward information, steps S22" to S23" are performed.

Step S22" includes obtaining a corresponding second adjustment amount $V_{out}2$ of the opening degree of the electronic expansion valve according to the change information of the rotational speeds of the compressor and the evaporator fan acquired:

$$V_{out}2 = K_{CS} \times \frac{dCS}{dt} + K_{BS} \times \frac{dBS}{dt},$$

in the formula, $K_{CS}$ is a feedback coefficient of the compressor, and CS is a rotational speed of the compressor, where BS is the rotational speed of the evaporator fan, and $K_{BS}$ is a feedback coefficient of the evaporator fan; the feedback coefficient of the compressor $K_{CS}$, and the feedback coefficient of the evaporator fan $K_{BS}$ are coefficients obtained according to experience or experimental calibration or fitting.

Step S23" includes adding, by the control system, the first adjustment amount $V_{out}1$ of the opening degree of the electronic expansion valve and the second adjustment amount $V_{out}2$ of the opening degree of the electronic expansion valve together, and outputting a control signal for adjusting the opening degree to the control terminal of the electronic expansion valve, to control the opening degree of the electronic expansion valve, that is, the adjustment amount $V_{out}$ of the opening degree of the electronic expansion valve may be obtained by calculating the following formula:

$$V_{out} = K_p \times e + K_d \times \frac{de}{dt} + K_i \times \int_n^t e\,dt + C + K_{CS} \times \frac{dCS}{dt} + K_{BS} \times \frac{dBS}{dt}.$$

A specific example is described hereinafter to illustrate the control process for the superheat degree in the method according to the present application.

When the vehicle travels from a tunnel to a place exposed in the sun during traveling, a temperature in the vehicle is abruptly increased, and as temperature in the evaporator is further increased, and an evaporating pressure is increased. According to a set air-out temperature, the rotational speed of the compressor increases, and the controller acquires the change information of the rotational speed of the compressor immediately, and performs a pre-adjustment to the opening degree of the electronic expansion valve immediately. The increase of rotational speed of the compressor may cause the actual superheat degree to be increased, and the controller acquires the actual superheat degree, the difference value e of the superheat degree is changed, and the opening degree of the electronic expansion valve is adjusted accordingly again. Thus, increase of the opening degree of the electronic expansion valve may bring more refrigerant flow quantity to the system, and the refrigerating capacity is gradually increased, then the temperature in the vehicle compartment is gradually reduced, and the actual superheat degree returns approximately to the preset superheat degree, thus the disturbance is eliminated, the rotational speed of the compressor does not increase anymore and tends to a certain rotational speed, and the opening degree of the electronic expansion valve does not increase anymore and gradually tends to a certain opening degree.

In the above process, the opening degree of the electronic expansion valve is immediately controlled to be adjusted after the rotational speed of the compressor changes, which has a much faster response speed and a smaller system fluctuation compared with the case that the opening degree of the electronic expansion valve is adjusted after the pressure sensor and the temperature sensor acquire a signal of the actual superheat degree.

Similarly, when the rotational speed of the evaporator fan increases, a heat exchanging efficiency of the evaporator is increased, and a temperature of the refrigerant is increased, which may also cause the actual superheat degree to be increased. The opening degree of the electronic expansion valve is immediately controlled to be adjusted after the rotational speed of the evaporator fan changes, which has a much faster response speed and a smaller system fluctuation compared with the case that the opening degree of the electronic expansion valve is adjusted after the pressure sensor and the temperature sensor acquire a signal of the actual superheat degree.

Figure 6:
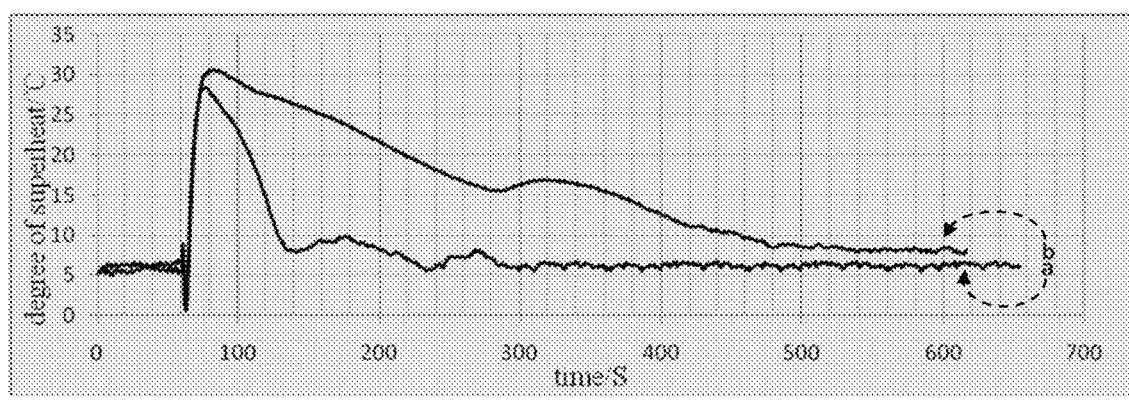
FIG. 6 is a diagram of relationship between a superheat degree and control time obtained by comparing the control method for the vehicle air-conditioning system according to the present application and the conventional technology.

FIG. 6 is a view showing the relationship between a superheat degree and a control time of the system in which a control method for the superheat degree only employing the actual superheat degree to control the opening degree of the electronic expansion valve is taken as a contrast method and is compared with the method according to the present application. In the figure, curve a represents a curve of relationship between the superheat degree and the control time of the method according to the present application; and curve b represents a curve of relationship between the superheat degree and the control time of the contrast method. As can be known from the curves a and b in the figure, if the superheat degree is controlled through the method according to the present application, a fluctuation range of the actual superheat degree is small and the control time thereof is short, while, if the superheat degree is controlled through the contrast method, a fluctuation range of actual superheat degree is large and the control time is long. That is to say, since the feedforward strategy is adopted to control the superheat degree in the method according to the present application, a disturbance magnitude and a change direction may be immediately obtained after the rotational speed of the compressor or the fan of the system changes, thus the change of the superheat degree may be estimated in advance, and compared with the conventional control method in which corresponding control is performed only after the actual superheat degree of the system changes, the system has a smaller fluctuation, and the time required by the actual superheat degree to return to the preset superheat degree is shorter.

In addition, it is to be noted that, a valve needle of the electronic expansion valve moves in a manner different from that of a thermal expansion valve. A stepper motor is adopted to drive the valve needle of the electronic expansion valve to rotate along screw threads, and each round of the stepper motor allows the valve needle to be lifted or lowered by one thread pitch, to realize the object of moving the valve needle to control the opening degree of the electronic expansion valve. A rotational speed of the stepper motor is restricted by a coil, and the performance of a controller, thus generally cannot reach a moving speed of the thermal expansion valve. Assuming that the rotational speed of the stepper motor is 80 pulses per second, and an entire travel of the coil of the valve is 480 steps, then it takes 6 seconds for the electronic expansion valve to switch from a fully closed state to a fully open state. Therefore, for optimizing the control to the superheat degree of the system, change rates of the rotational speeds of the compressor and the evaporator fan cannot be too large, thus preventing causing a change rate of the opening degree of the electronic expansion valve to be unable to keep up, and the superheat degree of the vehicle air-conditioning system to be maladjusted.

Thus, the second adjustment amount of the opening degree of the electronic expansion valve should not exceed a maximum change rate of the opening degree of the electronic expansion valve, that is to say, when the rotational speed of the compressor or the rotational speed of the evaporator fan changes, a feedback value corresponding to a change rate thereof does not exceed the action speed of the electronic expansion valve. Furthermore, it is to be noted that, in the method according to the present application, a pressure sensor may be adopted to acquire the rotational speed of the compressor or the rotational speed of the evaporator fan. After the vehicle air-conditioning system stopping operating for a long time, at the beginning of start for the first time, the system has not yet been operated in a stable working condition, and since a response speed of the pressure sensor is larger than that of the temperature sensor, a pressure decreases more fast than a temperature does, a superheat degree displayed may drastically increase at the beginning of the operation, and an opening degree of the electronic expansion valve obtained by calculation may be greater than the opening degree actually required, causing the flow rate of the refrigerant in the system to be too large and a current of the compressor to be too large to cause overload. Therefore, in the case that the vehicle air-conditioning system is just started or in the case that the compressor has stopped operating over a certain time, for example, 5 minutes, a restart speed is configured to be not greater than a fixed ratio such as 50% of the maximum rotational speed, and the restart speed maintains for a certain period of time, for example, 15 seconds, and then a normal control is restored.

The limitation to the change rates of the rotational speeds of the compressor and the evaporator fan, and the limitation to the compressor when the system starts may better protect the vehicle air-conditioning system, and improve a control accuracy of the superheat degree.

As shown in FIG. 7, a vehicle air-conditioning system is further provided according to the present application, which includes a compressor set and a throttling element. The compressor set includes a compressor, a condenser, a condenser fan, an evaporator; and an evaporator fan. The throttling element is embodied as an electronic expansion valve. The vehicle air-conditioning system further includes:

a first acquisition module 3, configured to acquire an opening degree of the electronic expansion valve in real time;

a first controller 4, configured to determine whether the electronic expansion valve is in a fault state according to an actual superheat degree, a preset superheat degree and the opening degree of the electronic expansion valve acquired, and generate a first control signal according to the actual superheat degree acquired in the case that the determination result shows that the electronic expansion valve is in the fault state; and an executive control mechanism 5, configured to receive the first control signal sent by the first controller 4, and adjust, according to the first control signal, a parameter of a device affecting change of the actual superheat degree in the vehicle air-conditioning system, which includes the rotational speed or displacement $C_1$ of the compressor, and/or the rotational speed $C_2$ of the evaporator fan.

In this embodiment, the first acquisition module 3 is in communication with the second controller 2 via a vehicle controller area network (CAN) bus or a vehicle local interconnect network (LIN) bus; and the first controller 4 is in communication with the electronic expansion valve via a vehicle CAN bus or a vehicle LIN bus.

In this embodiment, preferably, the executive control mechanism 5 is a vehicle-mounted controller electronic control unit (ECU).

The first controller 4 includes a determining module 41, a first control module 42, a second control module 43, and a third control module 44.

The determining module 41 is configured to determine whether the electronic expansion valve is in a fault state according to the actual superheat degree, the preset superheat degree, and the opening degree of the electronic expansion valve, and generate a first control command when a determination result is that the electronic expansion valve is in the fault state.

The first control module 42 is configured to receive the first control command sent by the determining module 41, and control the executive control mechanism 5 to execute the command of reducing the rotational speed or displacement $C_1$ of the compressor, or reducing the rotational speed $C_2$ of the evaporator fan, or turning off the compressor in the case that the actual superheat degree is greater than a first preset auxiliary superheat degree.

The second control module 43 is configured to receive the first control command sent by the determining module 41, and control the executive control mechanism 5 to execute the command of increasing the rotational speed or displacement $C_1$ of the compressor, or increasing the rotational speed $C_2$ of the evaporator fan, or turning off the compressor in the case that the actual superheat degree is smaller than a second preset auxiliary superheat degree.

The third control module 44 is configured to receive the first control command sent by the determining module 41, and control the executive control mechanism 5 to execute the command of keeping the rotational speed or displacement $C_1$ of the compressor unchanged, or keeping the rotational speed $C_2$ of the evaporator fan unchanged, or allowing the rotational speed or displacement $C_1$ of the compressor, or the rotational speed $C_2$ of the evaporator fan to enter into an appropriate adjustment state in the case that the actual superheat degree is greater than or equal to the second preset auxiliary superheat degree, and is smaller than or equal to the first preset auxiliary superheat degree.

The first control module 42 includes a first command module 421, a second command module 422, and a third command module 423.

The first command module 421 is configured to control the executive control mechanism 5 to execute the command of reducing the rotational speed or displacement $C_1$ of the compressor in the case that the rotational speed or displacement $C_1$ of the compressor is greater than a minimum value $C_{1\ min}+\Delta_1$.

The second command module 422 is configured to control the executive control mechanism 5 to execute the command of reducing the rotational speed $C_2$ of the evaporator fan in the case that the rotational speed or displacement $C_1$ of the compressor reaches the minimum value $C_{1\ min}+\Delta_1$, and the rotational speed $C_2$ of the evaporator fan is greater than a minimum value $C_{2\ min}+\Delta_2$.

The third command module 423 is configured to control the executive control mechanism 5 to execute the command of turning off the compressor in the case that the rotational speed or displacement $C_1$ of the compressor reaches the minimum value $C_{1\ min}+\Delta_1$, and the rotational speed $C_2$ of the evaporator fan reaches the minimum value $C_{2\ min}+\Delta_2$.

The second control module 43 includes a fourth command module 431, a fifth command module 432, and a sixth command module 433.

The fourth command module 431 is configured to control the executive control mechanism 5 to execute the command of increasing the rotational speed or displacement $C_1$ of the compressor in the case that a low pressure of the vehicle air-conditioning system is higher than a low pressure alarm value, and a high pressure of the vehicle air-conditioning system is lower than a high pressure alarm value, and the rotational speed or displacement $C_1$ of the compressor is less than a maximum value $C_{1\ max}-\Delta_3$.

The fifth command module 432 is configured to control the executive control mechanism 5 to execute the command of increasing the rotational speed $C_2$ of the evaporator fan in the case that the low pressure of the vehicle air-conditioning system is lower than the low pressure alarm value, or the high pressure of the vehicle air-conditioning system is higher than the high pressure alarm value and the rotational speed $C_2$ of the evaporator fan is smaller than a maximum value $C_{2\ max}-\Delta_4$.

The sixth command module 433 is configured to control the executive control mechanism 5 to execute the command of turning off the compressor in the case that the low pressure of the vehicle air-conditioning system is lower than the low pressure alarm value, or the high pressure of the vehicle air-conditioning system is higher than the high pressure alarm value, and the rotational speed $C_2$ of the evaporator fan reaches the maximum value $C_{2\ max}-\Delta_4$.

Moreover, it is to be noted that, the first controller 4 further includes a hardware diagnosis module for hardware fault diagnosing, which is configured to detect a driving current and a driving voltage to obtain a fault information such as open circuit, short circuit, and out of step.

In this embodiment, a second embodiment of the vehicle air-conditioning system according to the present application is shown in FIG. 8. In this embodiment, the vehicle air-conditioning system further includes a second acquisition module 1 and a second controller 2.

The second acquisition module 1 is configured to acquire an actual superheat degree and a feedforward information affecting the change of the actual superheat degree in real time.

The second controller 2 is configured to store a preset superheat degree and receive the actual superheat degree and the feedforward information, and adjust the opening degree of the electronic expansion valve in real time according to the actual superheat degree, the preset superheat degree and the feedforward information.

In the vehicle air-conditioning system according to the present application, the opening degree of the electronic expansion valve is controlled by the actual superheat degree and the feedforward information, thus compared with the conventional technology, a magnitude and a change direction of a disturbance can be immediately obtained after the disturbance occurs to the system, thereby predicting a change of the superheat degree in advance, and a system fluctuation is small, and time required for the superheat degree to return to a control point is shorter compared with the conventional air-conditioning system in which corresponding control is performed only after the superheat degree of the system changes.

Preferably, the feedforward information acquired by the second acquisition module 1 includes: change of the rotational speed and/or displacement of the compressor; and/or change of the rotational speed of the evaporator fan.

The second acquisition module 1 includes an acquisition module configured to acquire change information of the rotational speed (displacement) of the compressor and/or change information of the rotational speed of the evaporator fan, and temperature sensors configured to acquire temperatures at an outlet and an inlet of the evaporator respectively, and the acquisition module may be embodied as a rotational speed sensor or a pressure sensor.

In this embodiment, preferably, the second controller 2 is in communication with the electronic expansion valve via a vehicle CAN bus or a vehicle LIN bus; and the second acquisition module 1 is in communication with the second controller 2 via a vehicle CAN bus or a vehicle LIN bus.

As shown in FIG. 8, the second controller 2 includes a PID control module 21, a feedforward control module 22, and an executive control module 23.

The PID control module 21 is configured to store a preset superheat degree, and compare an actual superheat degree received with the preset superheat degree, to obtain a difference value of superheat degree, and obtain a corresponding first adjustment amount of the opening degree of the electronic expansion valve according to the difference value of superheat degree.

The feedforward control module 22 is configured to acquire a corresponding second adjustment amount of the opening degree of the electronic expansion valve according to a change of the rotational speed or displacement of the compressor and/or a change of the rotational speed of the evaporator fan received.

The executive control module 23 is configured to actually control adjusting the opening degree of the electronic expansion valve according to the first adjustment amount of the opening degree of the electronic expansion valve, and the second adjustment amount of the opening degree of the electronic expansion valve.

In the PID control module 21, the first adjustment amount $V_{out}1$ of the opening degree of the electronic expansion valve is obtained by the following calculation:

$$V_{out}1 = K_p \times e + K_d \times \frac{de}{dt} + K_i \times \int_n^t e\, dt + C,$$

in the formula, e is a difference value of superheat degree, $K_p$ is a coefficient of proportionality, $K_d$ is a differential coefficient, $K_i$ is an integral coefficient, and C is a correction coefficient.

In the feedforward control module 22, the second output value $V_{out}2$ of the electronic expansion valve is obtained by the following calculation; the second adjustment amount $V_{out}2$ of the opening degree of the electronic expansion valve is any one of or the sum of a first part $V_{out}21$ of the second adjustment amount of the opening degree of the electronic expansion valve and a second part $V_{out}22$ of the second adjustment amount of the opening degree of the electronic expansion valve. The first part $V_{out}21$ of the second adjustment amount of the opening degree of the electronic expansion valve is calculated by the following formula:

$$V_{out}21 = K_{CS} \times \frac{dCS}{dt},$$

or the formula $$V_{out}21 = K_{CD} \times \frac{dCD}{dt},$$

or the formula:

$$V_{out}21 = K_{CS} \times \frac{dCS}{dt} + K_{CD} \times \frac{dCD}{dt},$$

the second part $V_{out}22$ of the second adjustment amount of the opening degree of the electronic expansion valve is calculated by the following formula:

$$V_{out}22 = K_{BS} \times \frac{dBS}{dt},$$

in the formula, $K_{CS}$ is a feedback coefficient of the rotational speed of the compressor, CS is the rotational speed of the compressor, BS is the rotational speed of the evaporator fan, $K_{BS}$ is a feedback coefficient of the evaporator fan; CD is a displacement of the compressor, and $K_{CD}$ is a feedback coefficient of the displacement of the compressor. In the executive control module 23, the first part $V_{out}21$ of the second adjustment amount of the opening degree of the electronic expansion valve and the second part $V_{out}22$ of the second adjustment amount of the opening degree of the electronic expansion valve are added together, and a control signal for adjusting the opening degree is outputted to the electronic expansion valve.

In this embodiment, the first acquisition module 1, the second acquisition module 3, the second controller 4 and the first controller 2 may be integrated in one chip, for example, uniformly built in a microprogrammed control unit (MCU), and in addition may also be assembled in multiple chips. Further the step of adding the first adjustment amount $V_{out}1$ of the opening degree of the electronic expansion valve and the second adjustment amount $V_{out}2$ of the opening degree of the electronic expansion valve together may be performed by an executive control module or an executive control mechanism, further, or may also be performed by other modules in the control system.

The embodiments described above are preferred embodiments of the present application, and it should be noted that, for the those skilled in the art, various improvements and modifications may further be made without departing from the principle of the present application, and these improvements and modifications are also deemed to fall into the protection scope of the present application.

The invention claimed is:

1. A control method for a vehicle air-conditioning system, comprising successive diagnosis cycles, wherein each of the successive diagnosis cycles comprises:
   acquiring, while performing a superheat degree control, an opening degree of an electronic expansion valve, an actual superheat degree, and a preset superheat degree;
   adding one to a quantity of abnormality times of the electronic expansion valve in response to the vehicle air-conditioning system meeting a first condition or a second condition; and
   resetting the quantity of abnormality times to be zero and entering a next one of the successive diagnosis cycles in response to the vehicle air-conditioning system meeting neither the first condition nor the second condition;
   wherein after adding one to the quantity of abnormality times of the electronic expansion valve, the method further comprises:
      determining that the electronic expansion valve is in a fault state in response to the quantity of abnormality times being greater than or equal to a preset number; and
      entering the next one of the successive diagnosis cycles in response to the quantity of abnormality times being smaller than a preset number;
   wherein after determining that the electronic expansion valve is in the fault state, the method further comprises:
      outputting a control signal to a vehicle-mounted electronic control unit (ECU); and
      adjusting, by the vehicle-mounted ECU, a device to adjust the superheat degree of the vehicle air-conditioning system, wherein the device comprises at least one of a compressor, an evaporator fan or a condenser fan; or controlling, by the vehicle-mounted ECU, to turn off the device or the air-conditioning system;
   wherein the first condition is: a result of the preset superheat degree minus the actual superheat degree being greater than a first fixed value, and the opening degree of the electronic expansion valve reaching a minimum value, and
   wherein the second condition is: a result of the actual superheat degree minus the preset superheat degree being greater than a second fixed value, and the opening degree of the electronic expansion valve reaching a maximum value.

2. The control method for the vehicle air-conditioning system according to claim 1, wherein each of the successive diagnosis cycles comprises:
   S01, acquiring the opening degree of the electronic expansion valve, the actual superheat degree, and the preset superheat degree, and going to step S021;
   S021, determining whether the preset superheat degree minus the actual superheat degree is greater than the first fixed value (w1), and going to S022 if the preset superheat degree minus the actual superheat degree is greater than the first fixed value (w1), and going to step S025 if the preset superheat degree minus the actual superheat degree is not greater than the first fixed value (w1);

S022, determining whether the opening degree of the electronic expansion valve reaches the minimum value; and going to step S023 if the opening degree of the electronic expansion valve reaches the minimum value, and going to step S025 if the opening degree of the electronic expansion valve does not reach the minimum value;

S023, adding 1 to the quantity of abnormality times (n), and going to step S024;

S024, determining whether the quantity of abnormality times (n) is greater than or equal to the preset number (N); and if the quantity of abnormality times (n) is greater than or equal to the preset number (N), determining that the electronic expansion valve is currently in the fault state, and going to step S03 or simultaneously going to step S03 and step S05;

S025, determining whether the actual degree of superheat minus the preset degree of superheat is greater than the second fixed value (w2); and going to step S026 if the actual degree of superheat minus the preset degree of superheat is greater than the second fixed value (w2), and going to step S05 if the actual degree of superheat minus the preset degree of superheat is not greater than the second fixed value (w2);

S026, determining whether the opening degree of the electronic expansion valve reaches the maximum value, and going to step S023 if the opening degree of the electronic expansion valve reaches the maximum value; and going to step S05 if the opening degree of the electronic expansion valve does not reach the maximum value;

S03, outputting the control signal of fault of the electronic expansion valve to the vehicle-mounted ECU; and S05, resetting the quantity of abnormality times (n).

3. The control method for the vehicle air-conditioning system according to claim 2, wherein before determining that the electronic expansion valve is in the fault state, the method comprises:

entering the next one of the successive diagnosis cycles in response to determining that an operating environment meets an operating limit of the air-conditioning system.

4. The control method for the vehicle air-conditioning system according to claim 2, wherein performing the superheat degree control comprises:

acquiring, by a control system in real time, an actual superheat degree, a preset superheat degree, and a feedforward information affecting the change of the actual superheat degree, wherein the feedforward information comprising the change of the rotational speed and/or displacement of the compressor; and/or the change of the rotational speed of the evaporator fan; and adjusting the opening degree of the electronic expansion valve in real time according to the actual superheat degree, the preset superheat degree, and the feedforward information acquired, to control the superheat degree of the vehicle air-conditioning system.

5. The control method for the vehicle air-conditioning system according to claim 1, wherein each of the successive diagnosis cycles comprises:

S01, acquiring the opening degree of the electronic expansion valve, the actual superheat degree, and the preset superheat degree, and going to step S025;

S025, determining whether the actual superheat degree minus the preset superheat degree is greater than the second fixed value (w2); and going to step S026 if the actual superheat degree minus the preset superheat degree is greater than the second fixed value (w2), and going to step S021 if the actual superheat degree minus the preset superheat degree is not greater than the second fixed value (w2);

S026, determining whether the opening degree of the electronic expansion valve reaches the maximum value; and going to step S023 if the opening degree of the electronic expansion valve reaches the maximum value, and going to step S021 if the opening degree of the electronic expansion valve does not reach the maximum value;

S023, adding 1 to the quantity of abnormality times (n), and going to step S024;

S021, determining whether the preset superheat degree minus the actual superheat degree is greater than the first fixed value (w1); and going to step S022 if the preset superheat degree minus the actual superheat degree is greater than the first fixed value (w1), and going to step S05 if the preset superheat degree minus the actual superheat degree is not greater than the first fixed value (w1);

S022, determining whether the opening degree of the electronic expansion valve reaches the minimum value; and going to step S023 if the opening degree of the electronic expansion valve reaches the minimum value, and going to step S05 if the opening degree of the electronic expansion valve does not reach the minimum value;

S024, determining whether the quantity of abnormality times (n) is greater than or equal to the preset number (N); and determining that the electronic expansion valve is in the fault state currently, and going to step S03 or simultaneously going to step S03 and step S05, if the quantity of abnormality times (n) is greater than or equal to the preset number of times (N);

S03, outputting the control signal of fault of the electronic expansion valve to the vehicle-mounted ECU; and S05, resetting the quantity of abnormality times (n).

6. The control method for the vehicle air-conditioning system according to claim 5, wherein before determining that the electronic expansion valve is in the fault state, the method comprises:

entering the next one of the successive diagnosis cycles in response to determining that an operating environment meets an operating limit of the air-conditioning system.

7. The control method for the vehicle air-conditioning system according to claim 5, wherein performing the superheat degree control comprises:

acquiring, by a control system in real time, an actual superheat degree, a preset superheat degree, and a feedforward information affecting the change of the actual superheat degree, wherein the feedforward information comprising the change of the rotational speed and/or displacement of the compressor; and/or the change of the rotational speed of the evaporator fan; and adjusting the opening degree of the electronic expansion valve in real time according to the actual superheat degree, the preset superheat degree, and the feedforward information acquired, to control the superheat degree of the vehicle air-conditioning system.

8. The control method for the vehicle air-conditioning system according to claim 1, wherein before determining that the electronic expansion valve is in the fault state, the method comprises:
    entering the next one of the successive diagnosis cycles in response to determining that an operating environment meets an operating limit of the air-conditioning system.

9. The control method for the vehicle air-conditioning system according to claim 1, wherein adjusting the parameter of the device comprises:
    controlling, by the vehicle-mounted ECU, to reduce a rotational speed and/or a displacement $C_1$ of the compressor, or reduce a rotational speed $C_2$ of the evaporator fan, or turn off the compressor, when the actual superheat degree is greater than a first preset auxiliary superheat degree;
    controlling, by the vehicle-mounted ECU, to increase the rotational speed and/or the displacement ($C_1$) of the compressor, or increase the rotational speed ($C_2$) of the evaporator fan, or turn off the compressor, when the actual superheat degree is smaller than a second preset auxiliary superheat degree; and
    controlling, by the vehicle-mounted ECU, to keep the rotational speed and/or the displacement ($C_1$) of the compressor, and the rotational speed ($C_2$) of the evaporator fan unchanged, when the actual superheat degree is greater than or equal to the second preset auxiliary superheat degree, and is smaller than or equal to the first preset auxiliary superheat degree.

10. The control method for the vehicle air-conditioning system according to claim 9,
    wherein controlling, by the vehicle-mounted ECU, to reduce the rotational speed and/or the displacement $C_1$ of the compressor, or reducing the rotational speed $C_2$ of the evaporator fan, or turning off the compressor comprises:
        controlling, by the vehicle-mounted ECU, to reduce the rotational speed or the displacement ($C_1$) of the compressor, when the rotational speed or the displacement ($C_1$) of the compressor is greater than a minimum value ($C_{1min}+\Delta_1$),
        controlling, by the vehicle-mounted ECU, to reduce the rotational speed ($C_2$) of the evaporator fan, when the rotational speed or displacement ($C_1$) of the compressor reaches the minimum value ($C_{1min}+\Delta_1$), and the rotational speed ($C_2$) of the evaporator fan is greater than a minimum value ($C_{2min}+\Delta_2$), and
        controlling, by the vehicle-mounted ECU, to turn off the compressor, when the rotational speed or displacement ($C_1$) of the compressor reaches the minimum value ($C_{1min}+\Delta_1$), and the rotational speed ($C_2$) of the evaporator fan reaches the minimum value ($C_{2min}+\Delta_2$);
    and wherein controlling, by the vehicle-mounted ECU, to increase the rotational speed and/or the displacement ($C_1$) of the compressor, or increase the rotational speed ($C_2$) of the evaporator fan, or turn off the compressor comprises:
        controlling, by the vehicle-mounted ECU, to increase the rotational speed or the displacement ($C_1$) of the compressor, when an inlet pressure of the vehicle air-conditioning system is higher than an inlet pressure alarm value, an outlet pressure of the vehicle air-conditioning system is lower than an outlet pressure alarm value, and the rotational speed or the displacement ($C_1$) of the compressor is smaller than a maximum value ($C_{1max}-\Delta_3$);
        controlling, by the vehicle-mounted ECU, to increase the rotational speed ($C_2$) of the evaporator fan, when: the inlet pressure of the vehicle air-conditioning system is lower than the inlet pressure alarm value, or the high pressure of the vehicle air-conditioning system is higher than the outlet pressure alarm value, or and the rotational speed or the displacement ($C_1$) of the compressor reaches the maximum value ($C_{1max}-\Delta_3$); and the rotational speed ($C_2$) of the evaporator fan is smaller than a maximum value ($C_{2max}-\Delta_4$); and
        controlling, by the vehicle-mounted ECU, to turn off the compressor, when: the inlet pressure of the vehicle air-conditioning system is lower than the inlet pressure alarm value, or the outlet pressure of the vehicle air-conditioning system is higher than the outlet pressure alarm value, or the rotational speed or the displacement ($C_1$) of the compressor reaches the maximum value ($C_{1max}-\Delta_3$); and the rotational speed ($C_2$) of the evaporator fan reaches the maximum value ($C_{2max}-\Delta_4$).

11. The control method for the vehicle air-conditioning system according to claim 1, wherein before determining that the electronic expansion valve is in the fault state, the method comprises:
    entering the next one of the successive diagnosis cycles in response to determining that an operating environment meets an operating limit of the air-conditioning system.

12. The control method for the vehicle air-conditioning system according to claim 9, wherein before determining that the electronic expansion valve is in the fault state, the method comprises:
    entering the next one of the successive diagnosis cycles in response to determining that an operating environment meets an operating limit of the air-conditioning system.

13. The control method for the vehicle air-conditioning system according to claim 1, wherein performing the superheat degree control comprises:
    acquiring, by a control system in real time, an actual superheat degree, a preset superheat degree, and a feedforward information affecting the change of the actual superheat degree, wherein the feed forward information comprises one or more changes selected from the group consisting of the change of the rotational speed of the compressor, the change of the displacement of the compressor, and the change of the rotational speed of the evaporator fan; and
    adjusting the opening degree of the electronic expansion valve in real time according to the actual superheat degree, the preset superheat degree, and the feedforward information acquired, to control the superheat degree of the vehicle air-conditioning system.

14. The control method for the vehicle air-conditioning system according to claim 13, wherein a difference value of the superheat degree is obtained by comparing the actual superheat degree acquired with the preset superheat degree acquired, and a corresponding first adjustment amount of the opening degree of the electronic expansion valve is obtained according to the difference value of superheat degree; and
    a corresponding second adjustment amount of the opening degree of the electronic expansion valve is obtained according to the change of the rotational speed and/or displacement of the compressor and/or the change of the rotational speed of the evaporator fan;
    wherein a first adjustment amount $V_{out}1$ of the opening degree of the electronic expansion valve is obtained by calculating the following formula:

$$V_{out}1 = K_p \times e + K_d \times \frac{de}{dt} + K_i \times \int_n^t e\,dt + C,$$

in the formula, e is a difference value of superheat degree between the actual superheat degree and the preset superheat degree, $K_p$ is a proportionality coefficient, $K^d$ is a differential coefficient, $K^i$ is an integral coefficient, and C is a correction coefficient;

a second adjustment amount $V_{out}2$ of the opening degree of the electronic expansion valve is any one of or the sum of a first part $V_{out}21$ of the second adjustment amount of the opening degree of the electronic expansion valve, and a second part $V_{out}22$ of the second adjustment amount of the opening degree of the electronic expansion valve, the first part $V_{out}21$ of the second adjustment amount of the opening degree of the electronic expansion valve is obtained by calculating the formula:

$$V_{out}21 = K_{CS} \times \frac{dCS}{dt},$$

or the formula $$V_{out}21 = K_{CD} \times \frac{dCD}{dt},$$

or the formula $$V_{out}21 = K_{CS} \times \frac{dCS}{dt} + K_{CD} \times \frac{dCD}{dt},$$

and the second part $V_{out}22$ of the second adjustment amount of the opening degree of the electronic expansion valve is obtained by calculating the formula:

$$V_{out}22 = K_{BS} \times \frac{dBS}{dt},$$

in the formula, $K_{CS}$ is a feedback coefficient of the rotational speed of the compressor, CS is the rotational speed of the compressor, BS is the rotational speed of the evaporator fan, and $K_{BS}$ is a feedback coefficient of the evaporator fan; CD is a displacement of the compressor, and $K_{CD}$ is a feedback coefficient of the displacement of the compressor;

and the first part $V_{out}21$ of the second adjustment amount of the opening degree of the electronic expansion valve and the second part $V_{out}22$ of the second adjustment amount of the opening degree of the electronic expansion valve are added, and then a control signal for adjusting the opening degree is outputted to a control terminal of the electronic expansion valve.

* * * * *